(12) United States Patent
Kim et al.

(10) Patent No.: US 12,478,219 B2
(45) Date of Patent: Nov. 25, 2025

(54) BLENDER

(71) Applicant: LG ELECTRONICS INC., Seoul (KR)

(72) Inventors: Min Gyu Kim, Seoul (KR); Dae Yong Kang, Seoul (KR); Jin Hae Ye, Seoul (KR); Sang Jin Jung, Seoul (KR)

(73) Assignee: LG ELECTRONICS INC., Seoul (KR)

(\*) Notice: Subject to any disclaimer, the term of this patent is extended or adjusted under 35 U.S.C. 154(b) by 957 days.

(21) Appl. No.: 17/613,533

(22) PCT Filed: Aug. 6, 2020

(86) PCT No.: PCT/KR2020/010368
§ 371 (c)(1),
(2) Date: Jul. 5, 2022

(87) PCT Pub. No.: WO2021/029603
PCT Pub. Date: Feb. 18, 2021

(65) Prior Publication Data
US 2022/0346602 A1 Nov. 3, 2022

(30) Foreign Application Priority Data
Aug. 13, 2019 (KR) .................. 10-2019-0098866

(51) Int. Cl.
*A47J 43/07* (2006.01)
*A47J 43/046* (2006.01)
(Continued)

(52) U.S. Cl.
CPC ......... *A47J 43/0777* (2013.01); *A47J 43/046* (2013.01); *A47J 43/0716* (2013.01);
(Continued)

(58) Field of Classification Search
CPC .......................... A47J 43/046; A47J 43/0777
See application file for complete search history.

(56) References Cited

U.S. PATENT DOCUMENTS

2008/0273420 A1\* 11/2008 Ferk ................... A47J 43/0777
366/314
2013/0044443 A1 2/2013 Yoshifusa
(Continued)

FOREIGN PATENT DOCUMENTS

EP 0046169 A1 2/1982
EP 0046169 B1 8/1984
(Continued)

*Primary Examiner* — Elizabeth Insler
(74) *Attorney, Agent, or Firm* — Bryan Cave Leighton Paisner LLP

(57) ABSTRACT

A blender transmits an electrical signal via a transparent film so as to detect whether a container lid is closed. The blender includes a container body receiving food; a main body provided under the container body and supporting the container body; a container lid mounted removably to the upper surface of the container body and configured to open/close the upper part of the container body; and a detection system configured to detect whether the container lid is mounted to the container body, wherein the detection system includes a transparent electrode film attached to the surface of the container body and guiding the flow of electricity. Accordingly, the transparent electrode film can transmit whether the container lid is mounted to the main body without spoiling the appearance of the container body made of a transparent material.

14 Claims, 20 Drawing Sheets

(51) Int. Cl.
  *G01V 8/12*   (2006.01)
  *H01B 5/14*   (2006.01)
  *H10F 77/20*  (2025.01)
  *H01H 36/00*  (2006.01)

(52) U.S. Cl.
  CPC ............... *G01V 8/12* (2013.01); *H01B 5/14* (2013.01); *H10F 77/244* (2025.01); *H01H 36/0013* (2013.01)

(56) References Cited

U.S. PATENT DOCUMENTS

| | | | |
|---|---|---|---|
| 2015/0265983 A1* | 9/2015 | Fleming | B01F 35/2131 366/206 |
| 2017/0095122 A1* | 4/2017 | Hoare | A23N 1/003 |
| 2018/0020875 A1* | 1/2018 | Kolar | A47J 43/0777 366/279 |
| 2018/0255975 A1 | 9/2018 | Kolar | |
| 2019/0146744 A1 | 5/2019 | Chun | |
| 2022/0175194 A1 | 6/2022 | Antkowiak et al. | |

FOREIGN PATENT DOCUMENTS

| | | |
|---|---|---|
| JP | 2000139730 A | 5/2000 |
| KR | 100796634 B1 | 1/2008 |
| WO | 2017118379 A1 | 7/2017 |
| WO | 2018195039 A1 | 10/2018 |

\* cited by examiner

BLENDER

This application is the National Stage of International Application No. PCT/KR2020/010368, filed Aug. 6, 2020, which claims the benefit of Korean Patent Application No. 10-2019-0098868, filed Aug. 13, 2019, the contents of which are all hereby incorporated by reference herein in their entirety.

TECHNICAL FIELD

The present disclosure relates generally to a blender. More particularly, the present disclosure relates to a blender which has the function of detecting whether a container lid is closed by transmitting an electrical signal via a transparent film.

BACKGROUND

Generally, a blender is referred to as a mixer or crusher, and is mainly used for crushing or chopping food contained in a container body by rotating blades rotated by the motor.

In a normal blender, a main body having a motor operated by electricity is located at the lower side of the blender, and the container body receiving food is seated on the upper side of such a main body. Blades crushing or chopping the food are provided inside the container body, and are rotated by the rotational force of the motor.

Accordingly, when a user drives the motor by using a manipulation button or a knob of the main body after putting the food in the container body, the blades receiving the rotational force generated by the motor crush or chop the food contained inside the container body.

Such a blender has recently been developed in accordance with a user's desire to facilitate the intake of food, such as, office workers in their busy daily life. That is, a small hand blender has been developed, and a blender has been developed that allows the food to be crushed in a larger capacity or at high speed.

In addition, to process food ingredients contained in a container body of a blender in a fresher state, a vacuum blender, which cuts or crushes the food by vacuuming the inside of the container body has been disclosed.

However, what is increasingly emphasized in these various types of blenders is a safe use along with the taste and nutrition of the food processed by the blenders. That is, when a blade rotates in a state in which the container lid is opened, the food received in the container body is spilled to the outside and splattered, and when a child puts their hand inside the container body, an accident may occur.

Accordingly, a technology for detecting whether the container lid is mounted has been developed and disclosed.

For example, in U.S. Pat. Nos. 6,910,800 and 7,871,196, a push rod mechanically connecting the container body with the main body is installed, and when the container lid closes the container body, the container lid presses the push rod.

Specifically, in U.S. Pat. No. 6,910,800, a link is configured to be vertically long along a side surface of the container body, and when the container lid located at the upper side is closed, a protrusion of the container lid presses the upper end of the link downward to move the lower end of the link downward such that the container lid of the container body can be mechanically detected.

In addition, U.S. Pat. No. 7,871,196, a link configured to transmit whether the container lid of the container body is closed is not provided vertically on a side surface of the container body, but is provided inside a handle of the container body. That is, a push rod installed to be vertically long is installed in a groove of an inside of a handle, and when the push rod is moved downward due to the closure of the container lid from the upper side, a lower switch provided at the lower side is activated by the push rod to detect the closure of the container lid.

However, in such a prior art, a separate push rod or push block is required to be installed, and a link or push rod configured to be vertically long is required to be installed according to the length of the container body, and thus manufacturing and assembling thereof are difficult. Furthermore, the link or push rod may lose its detection function due to wear or damage thereto caused by frequent use, and may cause a detection failure (a signal transmission failure) due to the twisting or bending of the link or push rod, which is considerably long.

Furthermore, the push rod and a push detection part are required to be installed separately from each other, and the push detection part may be contaminated by moisture or food introduced thereinto. The push rod of the container body and the push detection part of the main body are required to be installed at positions corresponding to each other, so there is a problem in that the container body is required to be mounted only in a specific direction.

In addition, in a connection structure in which a mechanical structure (or a wire) like the prior art is used to transmit a signal to the upper and lower side of the container body, when the container body is formed to be transparent or translucent, at least a portion of the container body is required to be opaque such that a transmission equipment or wire is invisible from the outside, so the degree of freedom in design is reduced.

Additionally, in a method in which a mechanical structure (or a wire) is used, water scale or external contaminants build up in the gap of a part in which the structure is attached to or detached from, thereby causing contamination and water introduction therein.

In addition, in the conventional method in which a structure for a signal transmission is provided in the handle, the structure of the handle is complex, and since the structure is required to be installed in the narrow inner space of the handle, the assembly of the handle is difficult and repair thereof is also difficult during malfunction thereof.

Furthermore, the structure for a signal transmission is required to be installed vertically through the handle, and the upper and lower ends of the handle are constantly required to be attached to the container body. Accordingly, the degree of freedom in the design of the handle (the configuration of removing the lower end of the handle from the container body, etc.) decreases.

Accordingly, to solve such a problem, in European Patent No. EP2548485, there is a blender in which when a container lid closes a container body, a main body recognizes the closure of the container lid of the container body by using a wireless communication module.

However, in such a prior art, the wireless communication module is required between the container body and the main body, and a separate power supply (a battery or dry cell, etc.) is required to be provided in the container body so as to drive the wireless communication module.

In addition, there is a problem in that communication confusion occurs due to a plurality of communication and a communication error occurs. That is, wireless power transmission or wireless communication between the main body and an external electrical supply device (a cooktop, etc.) is required, and further, it is also required to transmit whether the closure of the container lid is detected by wireless communication between the container body and the main body, so communication confusion may occur.

Due to these prior problems, in US Patent Application Publication No. 2018-0020875, there has been recently disclosed an interlocking blending device in which a pair of transmission and reception coils are disposed in a main body, and a pair of reception and transmission coils corresponding to the coils are disposed in a container body, and when a container lid closes the container body, power is transmitted to the reception coil of the container body by the transmission coil of the main body, and in turn, is transmitted to the reception coil of the main body by the transmission coil of the container body such that the main body recognizes the closure of the container lid of the container body.

That is, in US Patent Application Publication No. 2018-0020875, there is disclosed a structure in which a push rod is installed vertically along the side surface of the container body, and a detection signal of the container lid is mechanically transmitted to the lower side of the container body, and according to whether a switch of the upper side of the container body is turned on or off by the magnet of the container lid, a circuit connected to the lower part of the container body is closed or opened such that the signal is or is not transmitted to a base.

However, even in such a prior art, each of the main body and the container body is required to have two coils, that is, the transmission coil and the reception coil, and a device which analyzes the power received by the reception coil of the main body is required.

Furthermore, the two coils are disposed in each of the main body and the container body, and when current flows through each of the coils, change in the induced current occurs due to interference between magnetic fields induced in the coils, so it is difficult to accurately analyze the power received by the reception coil of the main body.

In addition, the transmission coil of the main body transmits the power to the reception coil of the container body, and due to the closure of the container lid, the transmission coil of the container body transmits the power to the reception coil of the main body. Thus, there is a problem in that the transmission coil of the main body is required to transmit high power to the reception coil of the container body such that the reception coil of the main body receives a significant power.

Additionally, for connection between two switches located on the upper end portion of the container body and electrical signal transmission between the upper end lower ends of the container body, a connection wire is installed at the circumference of the upper end of the container body, and a connection is installed to connect the upper and lower ends of the container body to each other.

Accordingly, such connection wires are installed on the circumference of the upper end of the container body and vertically on the side surface of the container body, respectively, and thus spoil the appearance of the container body made of a transparent material. That is, the connection wire for electrical signal transmission is installed on the surface of the container body, and thus may be cut by interference, or the appearance of the container body is spoiled due to installation of the connection wire which is colored on the transparent container body.

Meanwhile, in such a prior art, the container lid is configured as a single part, so there is a problem in that when introducing food into the container body, the entirety of the container lid is required to be opened. Furthermore, the handle is made of a single material or of the same material as the material of the container body, so there is a problem in that the handle gives a crude or rough look to a user.

SUMMARY

Accordingly, the present disclosure has been made to solve the above problems occurring in the prior art, and is intended to propose a blender in which a detection signal of the closure of the container lid of a container body is electrically transmitted to a main body.

The present disclosure is intended to propose a blender in which the design of the container body made of a transparent material is maintained.

The present disclosure is intended to propose a blender in which detection error or contamination due to external contaminants such as water or food is prevented.

The present disclosure is intended to propose a blender which does not require a separate power supply (a battery) in the container body.

The present disclosure is intended to propose a blender in which error occurrence of a container lid detection signal due to a plurality of communication is prevented.

The present disclosure is intended to propose a blender in which the assembling and follow-up service thereof are convenient.

The present disclosure is intended to propose a blender in which the work of introducing food into the container body is convenient.

The present disclosure is intended to propose a blender which is provided with a handle having a sense of beauty, soft touch, and improved design freedom.

Technical Solution

In order to accomplish the above objectives, according to one aspect of a blender of the present disclosure, the blender may include a detection system configured to detect via electric signal whether a container lid is mounted.

In the blender of the present disclosure, a transparent electrode film may be provided between the upper and lower ends of a container body. Accordingly, without spoiling the design of the container body which is transparent, the signal of the upper end of the container body may be transmitted to the lower end thereof.

In the blender of the present disclosure, the transparent electrode film may be provided between an outer container body and an inner container body. Accordingly, detection error or contamination due to external contaminants may be prevented.

In the blender of the present disclosure, whether the container lid is mounted may be electrically detected by power transmitted from a main body to the container body through an induction coil.

In addition, in the blender of the present disclosure, a circuit provided in the container body may form a closed circuit such that the closure of the container lid is detected according to whether there is flow of electricity.

The blender of present disclosure may include a power transmission part and a power reception part provided in the main body and the container body, respectively, such that power of the main body is transmitted to the container body through inductive coupling between the power transmission part and the power reception part.

The blender of present disclosure may include a light transmission module and a light reception module formed to correspond to each other in the container body and the main body, respectively, the light transmission module being configured to generate light and the light reception module being configured to receive light.

The blender of present disclosure may include the container lid, a cap which is detachable being provided at the center of the container lid.

The blender of present disclosure may include a handle including an elastic material.

The blender of present disclosure may include the container body configured to receive food; the main body provided under the container body and supporting the container body; the container lid removably mounted to the upper surface of the container body and configured to open/close the upper part of the container body; and the detection system configured to detect whether the container lid is mounted to the container body.

In addition, the detection system may include the transparent electrode film attached to the surface of the container body and configured to guide the flow of electricity. Accordingly, without spoiling the design of the appearance of the container body made of a transparent material, whether the container lid is attached or detached may be transmitted to the main body.

Furthermore, the detection system may include the power transmission part configured to supply power to the container body, and the power reception part configured to receive the power supplied from the power transmission means.

In addition, the detection system may include an on/off part configured to open/close an electric circuit formed in the container body according to whether the container lid is closed, and a detection part allowing the electric circuit formed by the connection of the power reception part with the on/off part to form a closed circuit so as to detect whether current flows.

Accordingly, the detection system may detect the closure of the container lid by electricity supplied by the main body, thereby having a compact structure and an excellent detection function.

Meanwhile, the transparent electrode film may be provided between the outer container body and the inner container body.

Furthermore, a film guide to which the transparent electrode film is attached may be formed vertically on the surface of the container body.

The film guide may include a pair of guide ribs formed by protruding from a side of the surface of the container body, and a guide surface formed between the pair of guide ribs.

The guide surface may be configured as a flat surface.

The guide surface may be formed by protruding from a side of the surface of the container body or by being recessed therefrom.

The width of the guide surface may have a size corresponding to the width of the transparent electrode film.

In this case, the transparent electrode film may be attached to the guide surface configured as a flat surface, so the attachment thereof may be facilitated.

The on/off part may include a permanent magnet and a reed switch provided in the container lid and the container body, respectively.

The detection part may include the light transmission module provided in the container body and configured to generate light, and the light reception module provided in the main body and configured to receive the light transmitted by the light transmission module.

According to such a configuration, the signal of the closure of the container lid may be detected through the magnetic force of the permanent magnet and may be transmitted to the main body via light.

The container body may include the outer container body constituting the appearance of the container body, and the inner container body provided inside the outer container body.

A coil holder may be provided between the bottom surface of the outer container body and the lower surface of the inner container body.

The power reception part or the light transmission module may be mounted to the coil holder.

Meanwhile, the upper end of the transparent electrode film may be connected to the reed switch, and a lower end thereof may be connected to the coil holder.

An upper cover and a lower cover having shapes corresponding to the upper and lower surfaces, respectively, of the coil holder may be provided at the upper and lower sides, respectively, of the coil holder and may cover the upper and lower parts, respectively, of the coil holder.

Due to such a configuration, the transmission and reception of power and a light signal may be stably performed.

In addition, a lid hole may be formed vertically through the center of the container lid, and the cap may be removably mounted to the lid hole.

The container lid may include an outer wall configured in a shape of a circular ring and constituting the appearance of the container lid, an inner wall provided to have a diameter smaller than the diameter of the outer wall and having the lid hole formed thereinside, and an upper surface connecting the upper end of the outer wall with the upper end of the inner wall.

A middle protrusion part supporting the lower end of the middle ring of the cap may be formed on the inner surface of the inner wall, and a lower protrusion part in contact with the outer surface of the lower ring may be formed by protruding inward from the inner surface of the inner wall.

In addition, a fastening protrusion may be formed on the lower end of the cap by protruding outward therefrom, and a locking path may be formed on the lower end of the inner wall such that the fastening protrusion is received in the locking path and not be removed therefrom.

Accordingly, when a user moves the cap up and down while gripping and turning the upper end of the cap with their hand, the detachment and attachment of the cap may be performed, so the food may be taken out of or put into the container body by a simple operation.

A main handle may be formed on the outer surface of the outer container body by protruding outward therefrom, and an outer handle and an inner handle may be provided on the outer sides of the main handle so as to cover the main handle. Furthermore, at least a portion of the inner handle may be made of an elastic material. Accordingly, a part with which user's fingers are in contact may be made of an elastic material, so the user's tactile feel may be improved.

In addition, a seating step may be formed on the upper surface of the main body by protruding to be stepped upward therefrom such that the lower surface of the container body is seated on the seating step, wherein the seating step may include a lower step having a diameter corresponding to the lower end of the container body, and an upper step formed by protruding upward from the lower step and having a diameter smaller than the diameter of the lower step.

Furthermore, the power transmission part and the light reception module may be mounted to the upper surface of the upper step. According to such a configuration, the power transmission part and the power reception part may be located to be close to each other, and the light transmission module and the light reception module may be located to be close to each other.

A lower step ring and an upper step ring having shapes corresponding to the outer surfaces of the lower step and the upper step, respectively, may be provided on the outer surfaces of the lower step and the upper step, respectively. Accordingly, it is possible to create a clean and smooth image and a luxurious product image.

An elastic member made of an elastic material may be provided on a step surface located between the upper step and the lower step. Accordingly, impact occurring during the seating of the container body may be prevented.

Meanwhile, a container body detection switch for detecting whether the container body is seated on the upper surface of the main body or a Hall sensor for determining a type of the container body seated on the main body may be mounted to the upper surface of the upper step.

The power transmission part and the light reception module may be installed on the right and left ends, respectively, of the upper surface of the upper step. Additionally, the container body detection switch and the Hall sensor may be fixedly installed on the front and rear end parts, respectively, of the upper surface of the upper step.

In this case, it is possible to detect whether the container lid is mounted, whether the container body is mounted to the main body, and the type of the container body.

Advantageous Effects

The blender of the present disclosure has the following effects.

First, in the blender of the present disclosure, an electrical circuit formed in the container body may be configured to be opened or closed according to whether the container lid is closed such that the closure of the container lid is electrically detected. Accordingly, the blender of the present disclosure may perform precise detection even during long-term use compared to a mechanical detection of the prior art. That is, operation error due to deformation or damage caused by long-term use of a link or push rod in a prior art may be prevented.

Second, in the blender of the present disclosure, the transparent electrode film may be attached vertically on the surface of the transparent container body such that electricity is transmitted between the upper and lower sides of the container body so as to detect whether the container lid is attached or detached. Accordingly, without spoiling the exterior design of the transparent container body, the container lid may be detected. That is, the design freedom of the container body may be improved.

Third, in the blender of the present disclosure, a transparent electrode film, a permanent magnet, and a reed switch may be used to transmit a container lid detection signal of the upper end of the container body to the lower side thereof. Accordingly, the assembling and installation of the blender may be easy compared to the use of the link or push rod of the prior art, and may not require the push rod or the push detection part, so the blender of the present disclosure may be light and have a reduced manufacturing cost.

Fourth, in the blender of the present disclosure, the transparent electrode film may be provided between the outer container body and the inner container body. That is, the transparent electrode film may be attached to the inner surface of the outer container body. Accordingly, the transparent electrode film may be attached without being exposed to the outside, and thus may be prevented from being cut due to external interference or from being contaminated due to external contaminants.

Fifth, in the blender of the present disclosure, as the detection part determining whether a closed circuit is formed in the container body, the light transmission module which generates light and the light reception module which receives the light transmitted by the light transmission module may be used. Accordingly, the closing and opening of the container lid may be detected by using light, thereby realizing an excellent detection function and compact product configuration compared to a mechanical detection structure.

Sixth, in the blender of the present disclosure, the coil holder provided with the power reception part and the light transmission module may be installed between the bottom surface of the outer container body and the lower surface of the inner container body, and such a coil holder may be covered by the upper cover and the lower cover. Accordingly, the power reception part and the light transmission module, which are electrical parts attached to the container body, which is often moved may be protected from external contact or interference to stably perform the transmission and reception of a signal.

Seventh, in the blender of the present disclosure, the power transmission part and the power reception part may be provided in the main body and the container body, respectively, to transmit power by induced electromotive force. Accordingly, a separate battery may not be required for power for detecting the container lid, so the container body may be light and usability thereof may be improved.

Eighth, in the blender of the present disclosure, only one induction coil may be used in each of the power transmission part and the power reception part, so magnetic interference due to two coils disposed in each of the power transmission part and the power reception part in the prior art may be prevented, thereby facilitating power analysis and enabling precise detection with lower power.

Ninth, in the blender of the present disclosure, the cap may be provided removably at the center of the container lid by protruding therefrom. Accordingly, a user may grip the upper end of the cap with their hand without directly gripping the edge of the container lid with their hand such that the container lid is detached from or attached to the container body, thereby improving usability.

Tenth, in the blender of the present disclosure, the cap mounted to the container lid may be mounted to or separated therefrom by a user gripping and turning the cap with their hand. Accordingly, without separating the container lid from the container body, a user may separate the cap from the container lid mounted to the container body and may introduce food into the container body or may mix the food, thereby making the use of the blender convenient.

Eleventh, in the blender of the present disclosure, the main handle may be formed on the outer container body by protruding outward therefrom, and may be formed integrally with the outer container body by injection molding. Accordingly, compared to when the main handle is separately formed and attached to the outer container body, the outer handle may be secure.

Twelfth, in the blender of the present disclosure, the main handle may be provided with the outer handle and the inner handle. Additionally, the outer handle may be made of a material such as a stainless steel material which is smooth and rigid, and a part of the inner handle with which the user's fingers are in contact may be made of an elastic material such as rubber. Accordingly, the appearance of the handle may form beauty with a luxurious image, and a user's grip sense may be increased.

Thirteenth, in the blender of the present disclosure, the seating step may be formed on the upper surface of the main body by protruding upward therefrom, and may support the container body such that the lower end of the container body is mounted to the seating step. Furthermore, the outer surface of such a seating step may be covered by a stainless steel material. Accordingly, even when a user moves the container body upward from the main body, the upper end of the main body may maintain a neat and beautiful appearance.

Fourteenth, in the blender of the present disclosure, the seating step of the main body may be formed to be stepped, and an elastic member made of an elastic material may be provided on the step surface. Accordingly, even when a user mounts the container body to the main body, the elastic member may relieve impact to prevent damage to the main body, and the mounting may be smoothly performed, thereby realizing an excellent usability.

Fifteenth, in the blender of the present disclosure, the container body detection switch and the Hall sensor may be provided in the main body. Accordingly, whether the container body is mounted to the main body may be detected or the type of the container body may be identified, thereby improving the function of the blender.

Sixteenth, in the blender of the present disclosure, the container lid detection signal may be transmitted through the container body by the transparent electrode film. Accordingly, compared to a method in which a signal is mechanically transmitted through a handle, the degree of design freedom for the shape of a handle may be improved. That is, the lower end of the handle may not be required to be attached to the container body, thereby making the change of a handle design free.

DETAILED DESCRIPTION

Hereinafter, a blender of the present disclosure will be described in detail with reference to the accompanying drawings.

Figure 1:
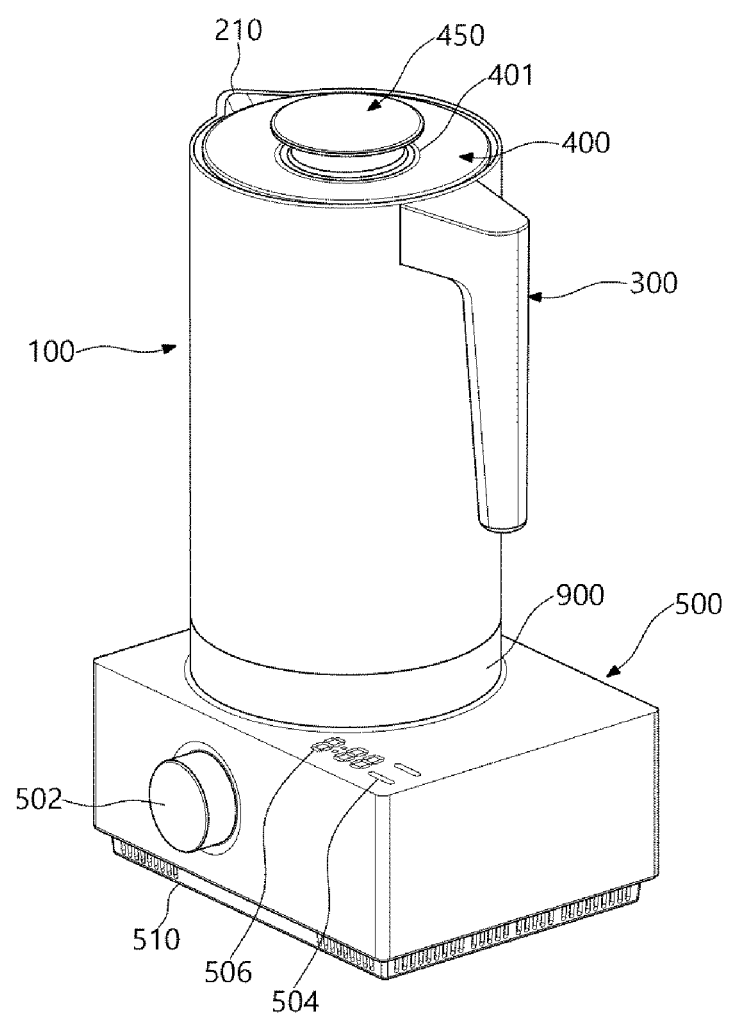
FIG. 1 is a perspective view illustrating a configuration of a blender according to an exemplary embodiment of the present disclosure.
Figure 2:
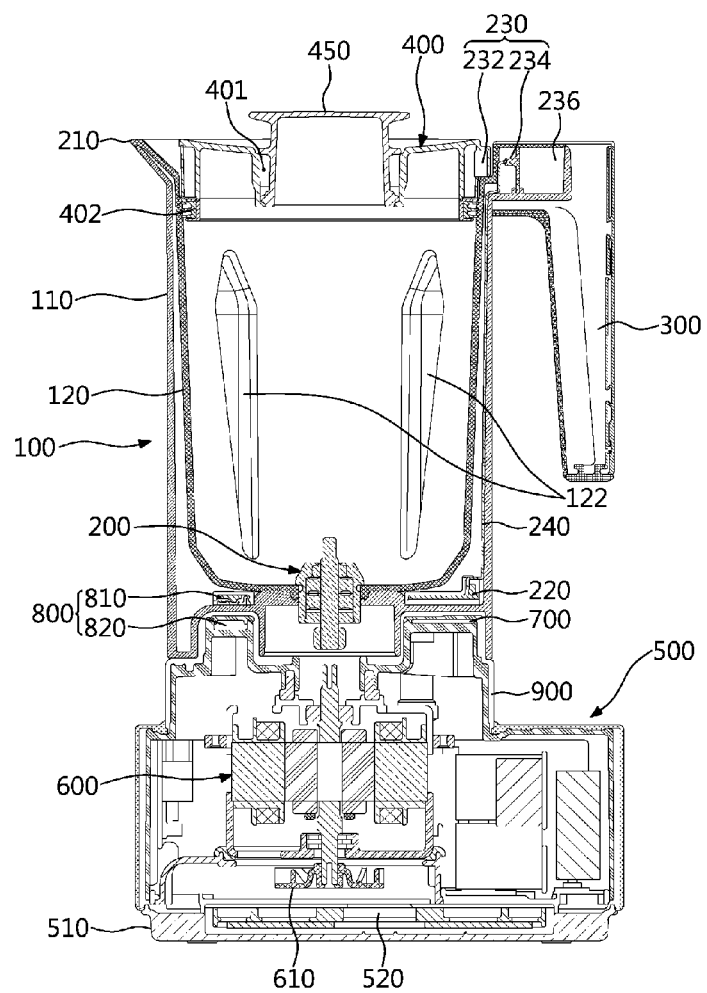
FIG. 2 is a vertical sectional view illustrating an internal configuration of the blender according to the embodiment of the present disclosure.

FIGS. 1 and 2 are a perspective view and a vertical sectional view, respectively, illustrating a configuration of the blender according to a first embodiment of the present disclosure.

As illustrated in these drawings, the blender of the present disclosure may include a container body 100 located relatively at an upper side thereof and receiving food, and a main body 500 provided at a lower side of the container body 100 and supporting the container body 100.

The container body 100 may be a part in which the food is received and the process of cutting or crushing the food occurs, and the main body 500 may support the container body 100. Furthermore, multiple parts may be provided inside such a main body 500 to control the cutting or crushing of the food received in the container body 100, or to supply electric power.

The container body 100 may have a cylindrical shape as a whole, and an upper surface thereof may be configured to be open to introduce the food thereinto.

The container body 100 may be made of a transparent material such that an inside thereof can be seen from the outside. That is, the container body 100 may be made of glass or transparent plastic so that a user can check the state of the food contained inside the container body 100 from the outside.

A blade assembly 200 may be provided in an inner lower portion of the container body 100. The blade assembly 200 may have multiple blades mounted rotatably thereto such that the blades chops or crush the food received in the container body 100.

The blade assembly 200 may be connected to a motor assembly 600 to be described below, and be configured to be rotated by a rotational force generated by the motor assembly 600.

The container body 100 may be formed doubly. That is, the container body 100 may be composed of an outer container body 110 constituting the appearance thereof and an inner container body 120 provided inside the outer container body 110. The outer container body 110 and the inner container body 120 may be configured to be in contact with each other or to be spaced apart from each other by a predetermined distance from each other. Furthermore, only a portion of each of the outer container body 110 and the inner container body 120 may be configured to be in contact with each other.

At least one inner guide 122 may be provided in the container body 100 to have a predetermined length in a vertical direction. The inner guides 122 are intended to guide the food rotating in the container body 100, and may be configured in pairs symmetrical to each other in the front and rear or left and right of the inner container body 120.

A handle 300 grasped by a user may be formed by protruding from a right surface of the container body 100 to the right side. Such a handle 300 may be formed such that the user can grasp the handle with one hand, and in the present disclosure, an upper end of the handle is illustrated to be connected integrally to an upper surface of the container body 100.

Meanwhile, a spout 210 may be formed at the opposite side to the handle 300.

As illustrated in the drawing, the spout 210 may be formed on the upper end of a left surface of the container body 100, and may be a part through which the food completely crushed in the container body 100 is guided to be easily poured to the outside. Accordingly, such a spout 210 may be formed to gradually more protrude in the left direction going upward.

The upper surface of the container body 100 may be covered by a container lid 400. That is, the container lid 400 may be removably mounted to the upper surface of the container body 100, and open and close the upper surface of the container body 100.

The container lid 400 may cover the upper surface of the container body 100 such that the food contained in the container body 100 does not spill to the outside and foreign matter of the outside is not introduced into the container body 100.

The container lid 400 may be configured to be mounted to the container body 100 by pressing or rotating the container lid 400 by the user. A gasket 402 may be provided in an outer circumferential surface of the container lid 400 and block a gap between the container lid 400 and the container body 100. Of course, such a gasket 402 may function to allow the container lid 400 to be pressed and fitted to the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 and cover the lid hole 401.

As illustrated in the drawings, the cap 450 may be installed at the center of the container lid 400, and as a whole, may be formed to have a diameter smaller than a diameter of the container lid 400. The cap 450 may be removably mounted to the container lid 400 by forcible fitting by pressing or by rotating.

In the present disclosure, it is illustrated that the cap 450 is configured to be attached and detached from the container lid 400 by being rotated, and a detailed configuration thereof will be described below.

Since the cap 450 may be removably mounted to the container lid 400, the user may see the food contained inside the container body 100 by opening only the cap 450 without opening the container lid 400, and insert food into the container body 100 by opening the cap 450, or insert a mixing rod thereinto and stir the food contained inside the container body 100.

The upper end of the cap 450 may be configured by protruding toward a side upper more than the upper end of the container lid 400, so the cap 450 may function as a handle of the container to be grasped by the user when the user opens or closes the container lid 400.

As illustrated in the drawings, the main body 500 may be configured to have a hexahedral shape having the shape of a rectangular barrel as a whole and be provided under the container body 100 so as to support the container body 100, wherein the motor assembly 600 and multiple electronic parts such as a PCB (a printed circuit board) may be installed inside the main body 500. Of course, the external shape of such a main body 500 may be variously changed as required.

The motor assembly 600 may be provided at a center of an inside of the main body 500. The motor assembly 600 may generate a rotational force by power supplied from the outside so that the blades constituting the blade assembly 200 rotate.

Accordingly, a lower end of the blade assembly 200 may be connected to an upper end of the motor assembly 600.

A knob 502 may be provided on a front surface of the main body 500 by protruding forward therefrom. The knob 502 is intended to set an operation of the blender of the present disclosure, and may be rotatably mounted to the main body 500.

The knob 502 may be configured to control the operation intensity of the motor assembly 600. That is, the knob 502 may be configured to change the rotational speed of the motor assembly 600 to high speed or low speed by the clockwise or counterclockwise rotation of the knob 502.

Meanwhile, a manipulation part 504 may be provided on the upper surface of the main body 500.

The manipulation part 504 is intended to manipulate the blender of the present disclosure by touching, and may be configured to manipulate the starting and stopping of the operation of the blender.

Of course, the knob 502 and the manipulation part 504 may be configured to selectively set or manipulate the operation of the blender, or may be configured to overlap with each other in the functions of the setting and manipulating. That is, for convenience, the knob 502 and the manipulation part 504 may be configured to overlap with each other in the functions such that the user may select any one of the knob 502 or the manipulation part 504 to set or manipulate the operation of the blender.

A display part 506 may be provided at a side of the manipulation part 504 (a left side in FIG. 1). That is, the display part 506 may be provided on the upper surface of the main body 500. Such a display part 506 may function to display the state of the operation of the blender such that the user can check the state thereof. Accordingly, such a display part 506 may be configured as a seven-segment display.

A cooling fan 610 may be provided at a lower side of the motor assembly 600.

The cooling fan 610 may be connected to the lower end of the motor assembly 600 and be rotated by a rotating force generated by the motor assembly 600, thereby introducing an outside air into the main body 500 and forcing the flow of the air. Accordingly, the cooling fan 610 may allow air to be introduced into the main body 500 from the outside and to flow therein, and function to cool parts such as the PCB provided in the main body 500.

A base end 510 may be provided on the lower surface of the main body 500.

The base end 510 may be formed by protruding downward from the lower surface of the main body 500 and may have a space having a predetermined size therein to receive a wireless power module 520. The wireless power module 520 may function to receive external wireless power in a wireless method using induced electromotive force and to supply the wireless power to the motor assembly 600 provided inside the main body 500.

Meanwhile, a detection system may be provided in the main body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the main body 500.

More particularly, the detection system may include: a power transmission part 700 provided in the main body 500 and supplying power to the container body 100; a power reception part 220 provided in the container body 100 and receiving the power supplied by the power transmission part 700; an on/off part 230 provided at the upper side of the container body 100 and turning on/off the electric circuit formed in the container body 100 depending on whether the container lid 400 is closed; a transparent electrode film 240 provided on a surface of the container body 100 and made of a transparent material, the transparent electrode film connecting the power reception part 220 with the on/off part 230 so as to allow electricity to flow therebetween; and a detection part 800 provided on one side of the main body 500 or the container body 100 and allowing the electric circuit formed by the connection of the power reception part 220 with the on/off part 230 to form the closed circuit so as to detect whether the current flows.

The power transmission part 700 is intended to transmit power, which is introduced to the main body 500 from the outside of the main body 500 or stored in advance in the main body 500, to the container body 100, and may use an induction coil in which the induced electromotive force can be generated.

The power reception part 220 is intended to receive the power transmitted from the main body 500, and may be configured to have a structure corresponding to the structure of the power transmission part 700. That is, the power reception part 220 may use the coil such that the power is transmitted by the induced electromotive force generated between the power transmission part 700 and the power reception part 220.

The power transmission part 700 and the power reception part 220 may be located to be adjacent to each other so as to generate the induced electromotive force. Accordingly, in the present disclosure, the power transmission part 700 is illustrated to be mounted to the right upper end of the main body 500, and the power reception part 220 is illustrated to be mounted to the right lower end of the container body 100.

The on/off part 230 may be configured to turn on/off the electric circuit (not shown) formed in the container body 100 depending on whether the container lid 400 is mounted to the container body 100, and may include a permanent magnet 232 and a reed switch 234 provided in the container lid 400 and the container body 100, respectively.

As illustrated in FIG. 2, in the present disclosure, the permanent magnet 232 is illustrated to be mounted to the right edge of the container lid 400, and the reed switch 234 is illustrated to be mounted to the right upper end (a portion of the handle) of the container body 100.

More particularly, the reed switch 234 may be mounted to be received in a reed switch groove 236 formed in the upper end portion of the handle 300.

It is widely known that the reed switch has magnetic movable contacts enclosed in a glass tube, and when a magnet approaches the reed switch, the contacts in the glass tube contact with each other. Here, further detailed description of the configuration and principle of the reed switch will be omitted.

Of course, except for the use of the permanent magnet 232 and the reed switch 234 of such an on/off part 230, other electric on/off part or mechanical structures may be used to turn on/off the electric circuit, and the mounting positions of the permanent magnet 232 and the reed switch 234 respectively mounted to the container lid 400 and the container body 100 may be exchanged oppositely.

Various types of electrical devices or structures having a function that can detect whether electric current flows in the electric circuit formed in the container body 100 turned on/off by the on/off part 230 may be used as the detection part 800. However, in the present disclosure, a photosensor is used to detect light as an example.

Accordingly, the detection part 800 may include a light transmission module 810 provided in the container body 100 to generate light, and a light reception module 820 provided in the main body 500 to receive the light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the main body 500.

The light transmission module 810 may use an LED (light emitting diode) that emits light by electricity, and the light reception module 820 may use the photosensor that receives the light and changes the light into an electrical signal.

In addition, the transparent electrode film 240 may be provided between the outer container body 110 and the inner container body 120. More particularly, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off part 230 provided on the upper side of the container body 100 to be connected to the power reception part 220 and the light transmission module 810 provided on the lower end portion of the container body 100 so as to form the electric circuit.

Accordingly, the transparent electrode film 240 may be attached vertically and longitudinally on the surface of the container body 100 made of a transparent material and may function to guide the transmission of the electrical signal between the upper end and lower end of the container body 100.

Accordingly, when the container body 100 is made of the transparent material, and the transparent electrode film 240 is also made of the transparent material, and the transparent electrode film 240 may not be visually exposed, so the transparent material does not spoil the appearance of the container body 100 and may maintain the design thereof.

Furthermore, when the transparent electrode film 240 is attached to the surface of the container body 100, the transparent electrode film 240 may have a hole formed therein to remove air bubbles that may be generated between the attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the main body 500 by protruding upward therefrom.

The seating step 900 may be configured to have a circular shape corresponding to a shape of the lower end of the container body 100 such that the lower end of the container body 100 is mounted to the seating step 900 to be vertically removed therefrom.

In addition, the container body 100 may be formed doubly. That is, the container body 100 may be composed of the outer container body 110 and the inner container body 120, and the inner guide 122 may be formed on the inner surface of the inner container body 120 by protruding inward therefrom.

Hereinafter, the configuration of the container body 100 will be described in detail.

Figure 3:
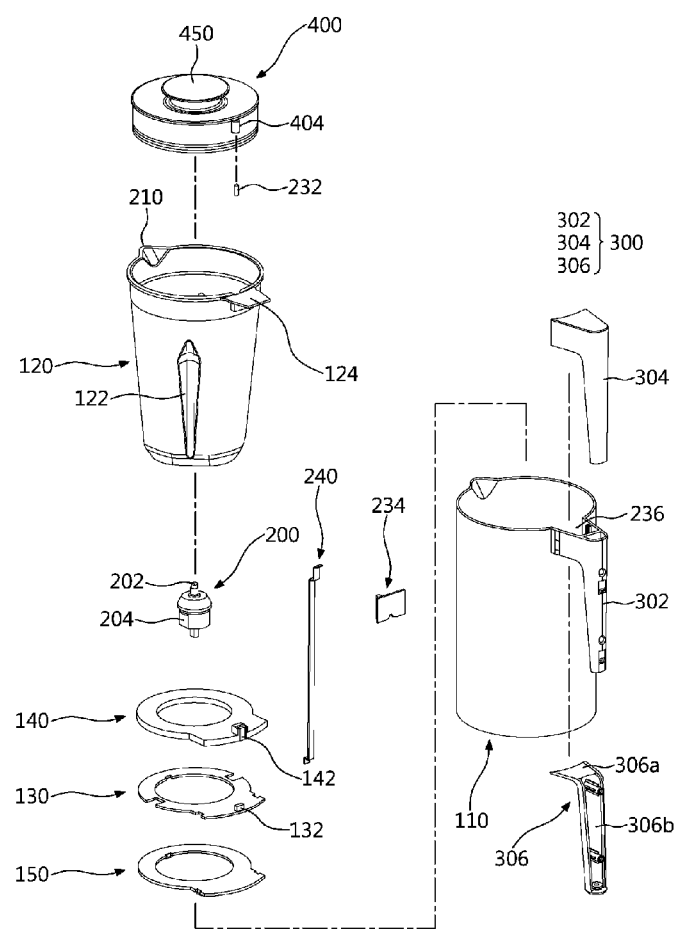
FIG. 3 is an exploded perspective view illustrating a detailed configuration of a container body according to an embodiment of the present disclosure
Figure 4:
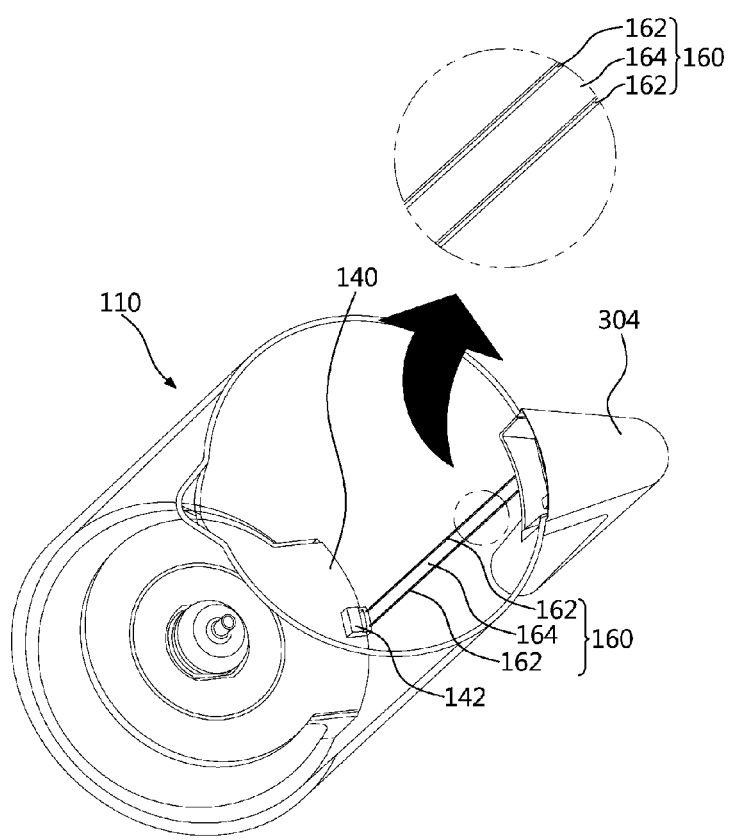
FIG. 4 is a perspective view illustrating a configuration of an outer container body constituting the blender according to an embodiment of the present disclosure.
Figure 5:
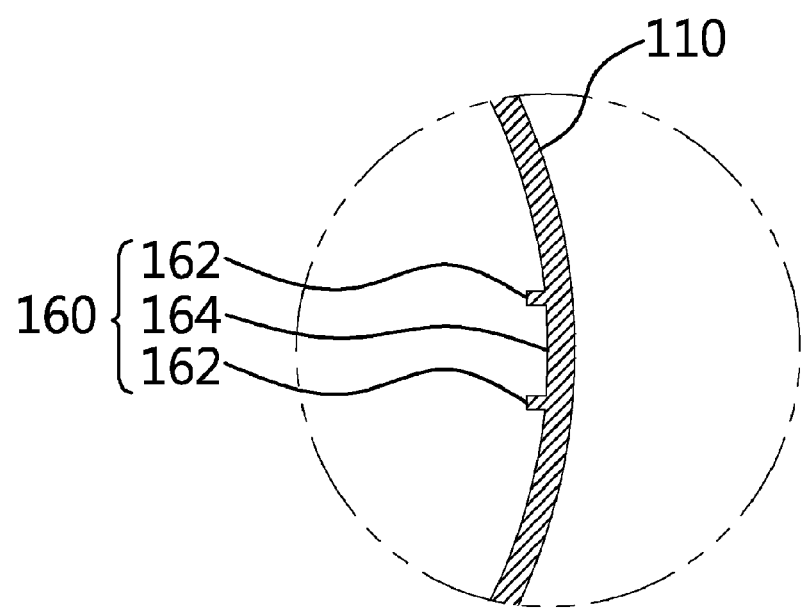
FIG. 5 is a partial cross-sectional view illustrating a detailed configuration of a film guide of the outer container body constituting the blender according to the embodiment of the present disclosure.

In FIGS. 3 to 15, a configuration of each of the container body 100 and the container lid 400 is illustrated in detail. That is, FIG. 3 illustrates an exploded perspective view of the container body 100, FIG. 4 illustrates a perspective view of a configuration of an outer container body constituting the blender according to the embodiment of the present disclosure, and FIG. 5 illustrates a partial cross-sectional view showing a detailed configuration of a film guide of the outer container body constituting the blender according to the embodiment of the present disclosure.

Figure 6:
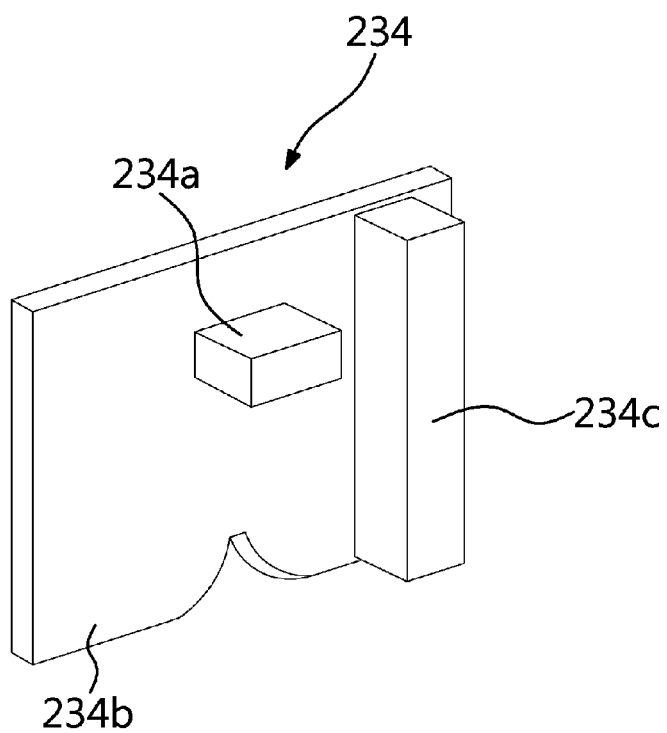
FIG. 6 is a perspective view illustrating a detailed configuration of a reed switch constituting the blender according to an embodiment of the present disclosure.
Figure 7:
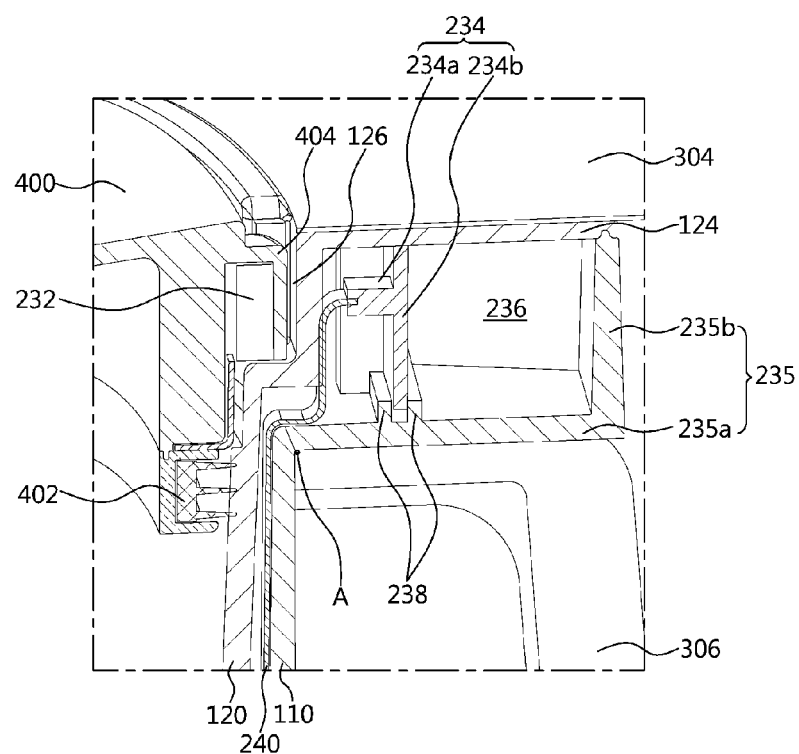
FIG. 7 is a partial sectional view illustrating a mounted state of the reed switch constituting the blender according to the embodiment of the present disclosure.
Figure 8:
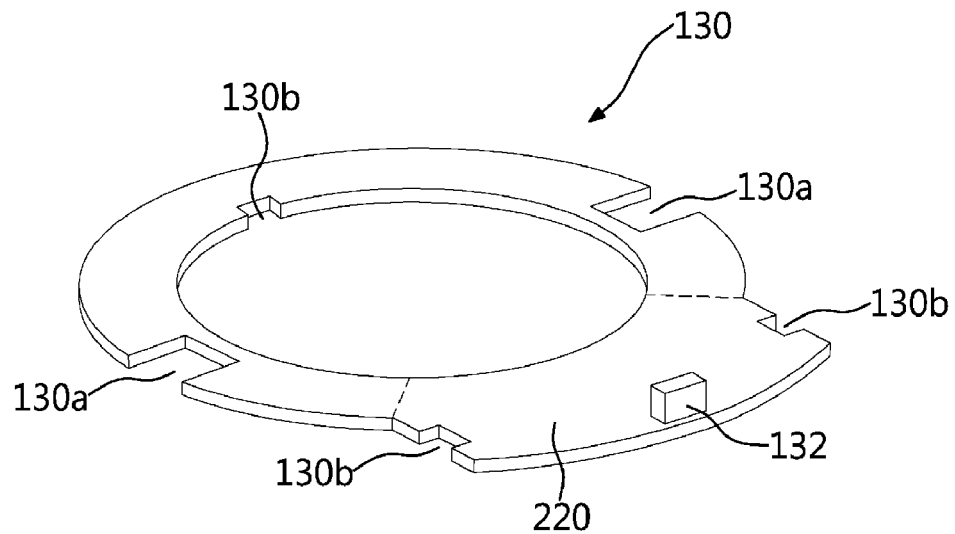
FIG. 8 is an upper perspective view of a coil holder constituting the blender according to an embodiment of the present disclosure.
Figure 9:
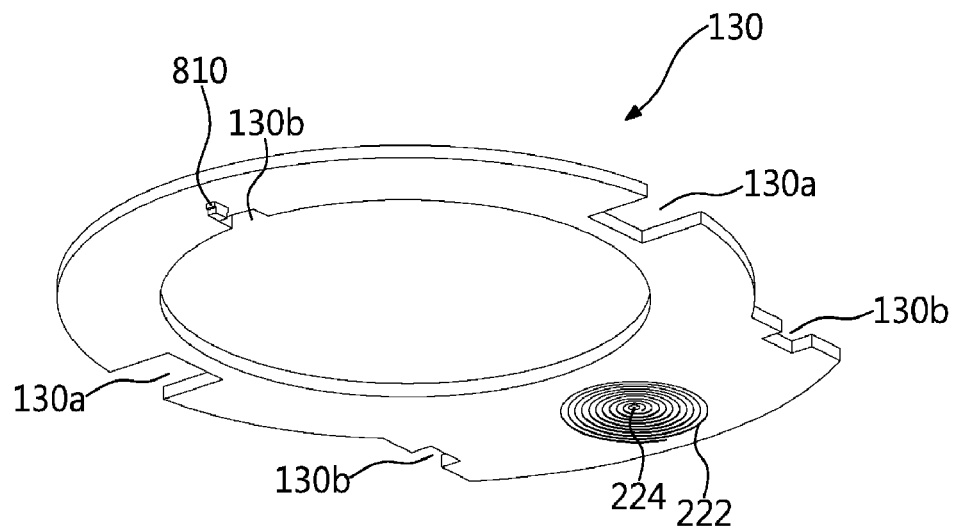
FIG. 9 is a lower perspective view of the coil holder constituting the blender according to the embodiment of the present disclosure.

In addition, FIGS. 6 and 7 illustrate a perspective view of a detailed configuration of a reed switch constituting the blender according to the embodiment of the present disclosure and a partial sectional view of a mounted state of the reed switch, respectively, and FIGS. 8 and 9 illustrate upper and lower perspective views, respectively, of a configuration of a coil holder.

Figure 10:
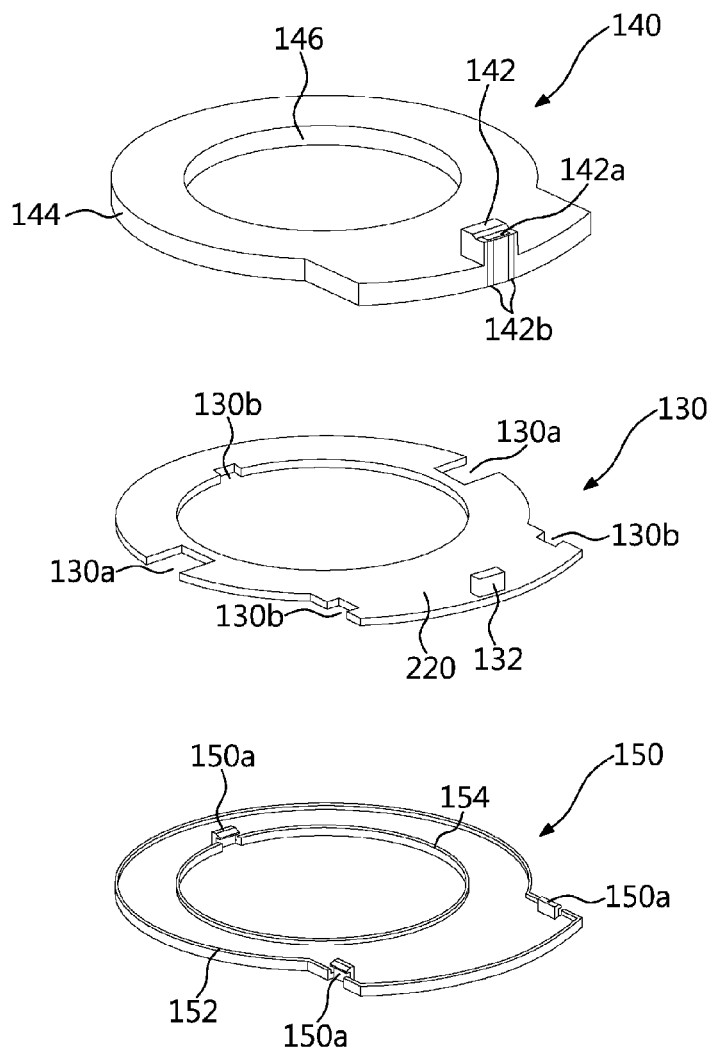
FIG. 10 is an upper exploded perspective view illustrating a detailed configuration of a coil holder assembly constituting the blender according to an embodiment of the present disclosure.
Figure 11:
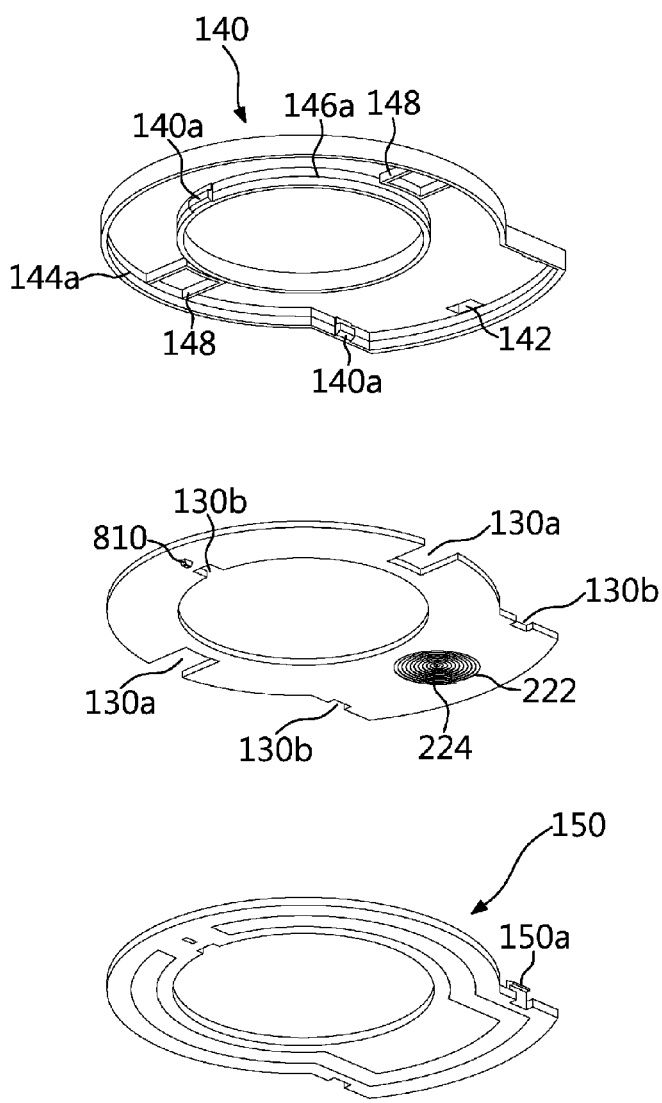
FIG. 11 is a lower exploded perspective view illustrating a detailed configuration of the coil holder assembly constituting the blender according to the embodiment of the present disclosure.
Figure 12:
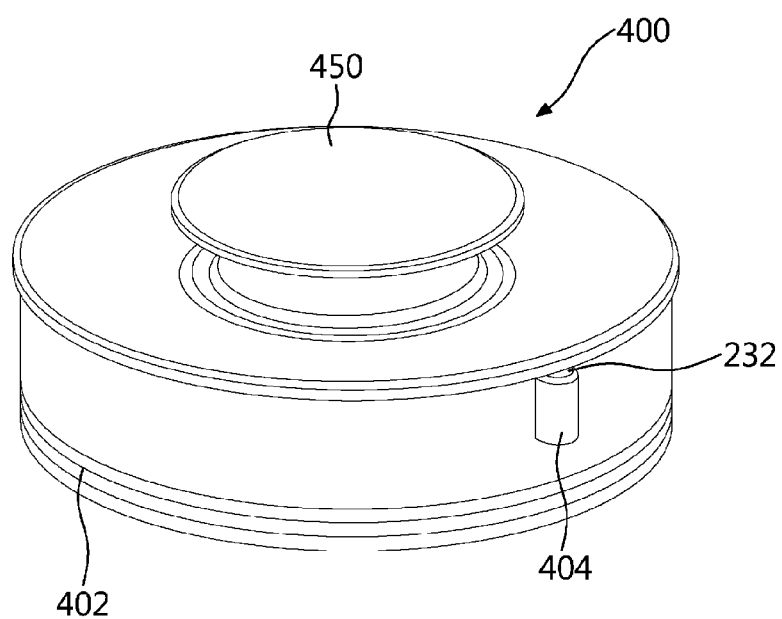
FIG. 12 is a perspective view of a container lid constituting the blender according to an embodiment of the present disclosure.
Figure 13:
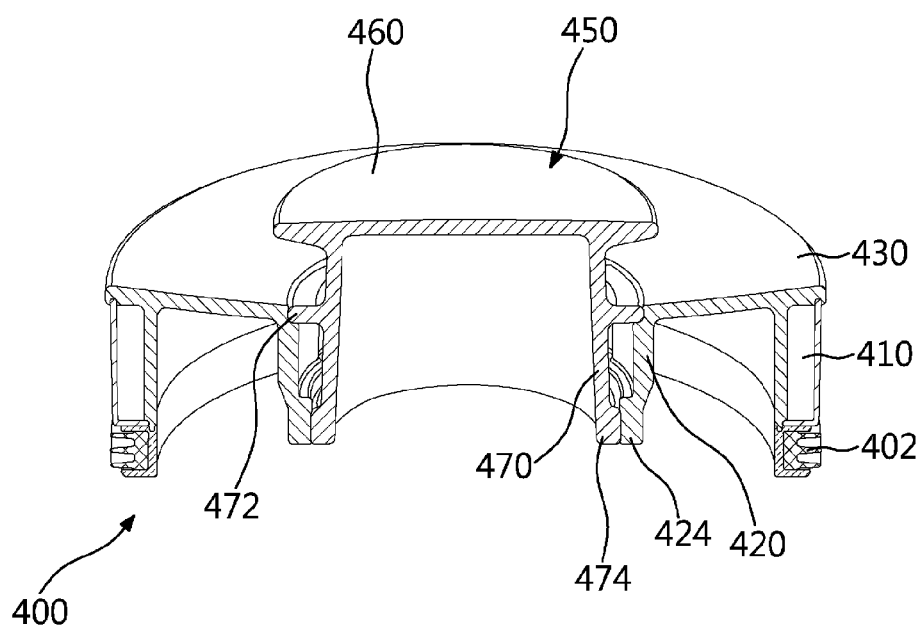
FIG. 13 is a cut-away perspective view of the container lid constituting the blender according to the embodiment of the present disclosure.
Figure 14:
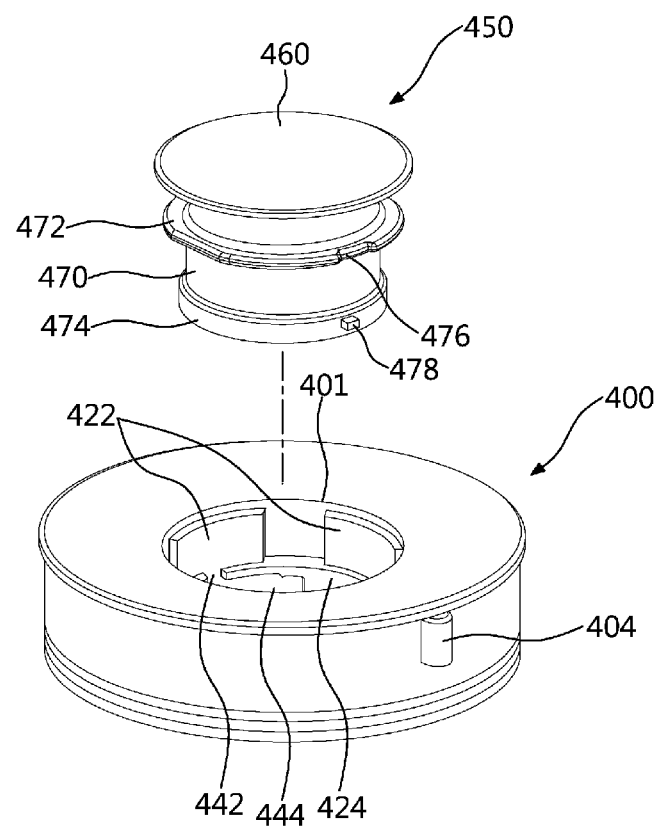
FIG. 14 is an exploded perspective view of the container lid constituting the blender according to the embodiment of the present disclosure.
Figure 15:
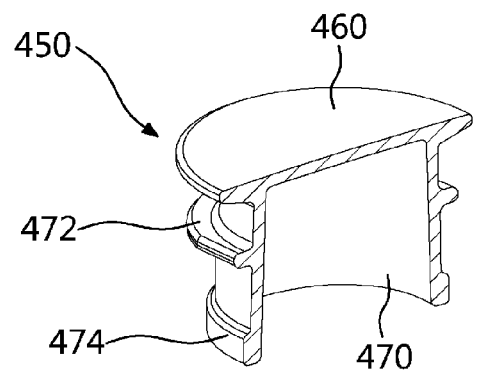
FIG. 15 is an exploded cut-away perspective view of the container lid constituting the blender according to the embodiment of the present disclosure.
Figure 15:
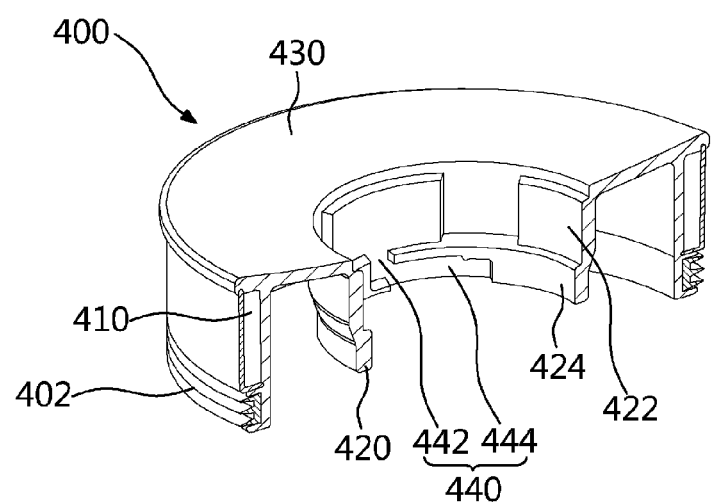
Figure 16:
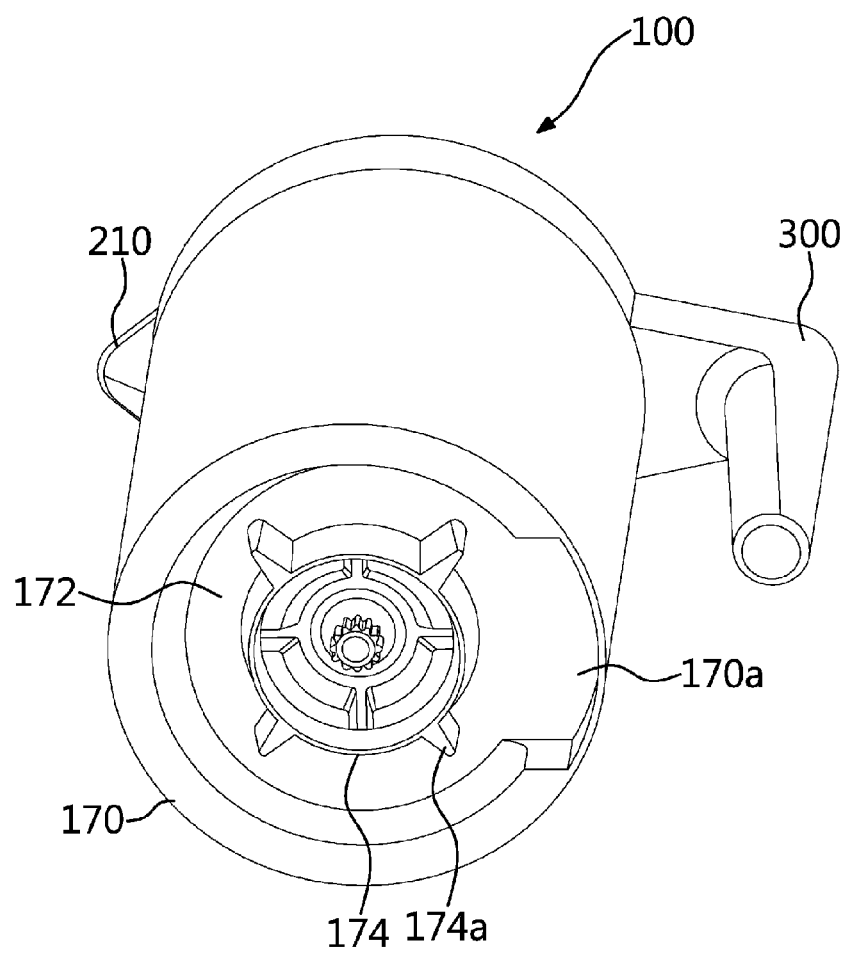
FIG. 16 is a lower perspective view of the container body constituting the blender according to an embodiment of the present disclosure.

In addition, FIGS. 10 and 11 illustrate upper and lower exploded perspective views, respectively, of a detailed configuration of a coil holder assembly constituting the blender according to the embodiment of the present disclosure, FIGS. 12 and 13 illustrate a perspective view and a cut-away perspective view of a container lid 400, respectively, and FIGS. 14 and 15 illustrate an exploded perspective view and an exploded cut-away perspective view, respectively, of the container lid 400. FIG. 16 is a lower perspective view of a container body 100.

As illustrated in these drawings, the container body 100 may be doubly configured to have a cylindrical shape as a whole. That is, the container body 100 may include an outer container body 110 constituting the appearance thereof, and an inner container body 120 provided inside the outer container body 110.

The container body 100, that is, the outer container body 110 and the inner container body 120 may be made of a transparent material. That is, the container body 100 may be made of a transparent material such as glass, Tritan, or transparent plastic so that a user can check the state of the food contained inside the container body 100 from the outside.

The outer container body 110 may constitute the appearance of the container body, and be configured to have a cylindrical shape with the same top and bottom sizes, and a main handle 302 may be formed at the outer right surface thereof by protruding therefrom to the right such that a user can grasp the handle.

The main handle 302 may be formed to have an L shape, and the upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to the main handle formed as a part separate from the outer container body 110 to be fixed thereto.

A mounting end 235 having predetermined space therein may be formed at a portion at which the main handle 302 is connected to the container body 100. The mounting end 235 may be a part in which the reed switch 234 is installed.

The reed switch groove 236 receiving the reed switch 234 may be formed inside the mounting end 235. That is, the reed switch groove 236 may be formed in the upper end of the main handle 302, and may provide a space to mount the reed switch 234 therein, and the left of such a reed switch groove 236 may be open.

More specifically, the mounting end 235 may include a bottom surface 235a formed by bending vertically to a side from the side surface of the outer container body 110 and extending, and a side surface 235b formed by bending vertically upward from the right end of the bottom surface 235a and extending.

Accordingly, the reed switch groove 236 having a predetermined size may be formed at the upper side of the bottom surface 235a, and the upper portion of the reed switch groove may be covered by a covering end 124 extending laterally from the upper end of the inner container body 120, and the left of the reed switch groove may be open such that the transparent electrode film 240 can connect to the reed switch.

A pair of mounting ribs 238 spaced apart by a predetermined distance from each other may be formed on the bottom surface 235a by protruding upward therefrom such that the pair of mounting ribs have predetermined heights, and the reed switch 234 may be fixedly mounted between the pair of mounting ribs 238.

Specifically, the reed switch 234 may be composed of a switch part 234a provided with a switch, and a support piece 234b supporting the switch part 234a.

As illustrated in FIG. 7, the support piece 234b may be configured as a flat plate having a predetermined thickness, and may be vertically installed in the reed switch groove 236 so as to fixedly support the switch part 234a. That is, the lower end of the support piece 234b may be fitted and held between the pair of mounting ribs 238.

Accordingly, the lower end of the support piece 234b is preferably configured to have a size corresponding to a gap between the pair of mounting ribs 238.

More preferably, the lower end of the support piece 234b may be forcibly fitted into the gap between the pair of mounting ribs 238.

As illustrated in FIG. 7, the switch part 234a may be installed by protruding leftward from the support piece 234b, and the upper end of the transparent electrode film 240 may be connected to the left end of such a switch part 234a.

In addition, a support protrusion 234c may be formed on an end of the support piece 234b. As illustrated in FIG. 6, the support protrusion 234c may be formed by protruding by a predetermined height from the left or right end of the support piece 234b such that the reed switch 234 can be easily mounted to the mounting end 235 or the covering end 124 of the inner container body 120.

An outer handle 304 and an inner handle 306 may be provided on the outer sides of the main handle 302. That is, as illustrated in FIG. 3, the outer handle 304 may be provided at the right of the main handle 302, and the inner handle 306 may be provided at the left of the main handle 302.

More particularly, the outer handle 304 may also be configured to have an L shape as a whole as does the main handle 302, so as to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape so as to correspond to the left and lower surfaces of the main handle 302, and at least a portion thereof may be made of an elastic material.

Particularly, the inner handle 306 may include a connection part 306a covering the lower part of the upper end of the main handle 302, and a grasping part 306b extending downward from the connection part 306a and covering the left surface of the main handle 302.

Like the outer handle 304, the connection part 306a may be made of a smooth and strong material, and the grasping part 306b may be a part on which a user's fingers are wrapped, and be made of an elastic material. That is, the connection part 306a may be made of stainless steel, and the grasping part 306b may be made of an elastic material such as rubber that can give a user a soft touch since the four fingers (except for the thumb) of the user cover the grasping part.

The inner container body 120 may be configured to have a size (a diameter) smaller than a size (a diameter) of the outer container body 110 and may sit inside the outer container body 110.

The inner container body 120 may be configured to have a cylindrical shape having an open upper part. More particularly, as illustrated in the drawings, the inner container body 120 may be configured to have a tapered shape having a diameter gradually decreasing going toward the lower side thereof.

In addition, the multiple inner guides 122 may be vertically formed on the inner surface of such an inner container body 120 as described above, and the blade assembly 200 may be mounted to the lower end of the inner container body 120.

The spout 210 may be formed on the left upper end of the inner container body 120 by protruding therefrom to the left, and a covering end 124 may be formed on the right upper end of the inner container body 120 by extending therefrom to the right.

The covering end 124 may cover the upper surface of the reed switch groove 236 of the outer container body 110. The covering end 124 may be configured to be a flat plate having a predetermined thickness, and to have a width gradually decreasing going toward the right to correspond to the size of the upper end of the reed switch groove 236.

The blade assembly 200 may be mounted to the lower end of the inner container body 120.

The blade assembly 200 is intended to allow the food to be finely crushed or mixed by the blades, and may include: a blade shaft 202 rotated by receiving the rotational force generated from the motor assembly 600; a blade body 204 provided at the outside of the blade shaft 202 and supporting the blade shaft 202; and at least one blade connected to the blade shaft 202 and crushing the food by rotating.

A coil holder assembly may be provided between the outer container body 110 and the inner container body 120.

The coil holder assembly may include a coil holder 130 having an induction coil, and an upper cover 140 and a lower cover 150 covering the upper and lower sides of the coil holder 130, respectively.

Particularly, the coil holder 130 may be provided between the bottom surface of the outer container body 110 and the lower surface of the inner container body 120, and the power reception part 220 and the light transmission module 810 may be mounted to such a coil holder 130.

The entirety of the coil holder 130 may have a shape of a circular ring having a predetermined thickness, and the power reception part 220 may be provided at the right end of the coil holder 130 having such a ring shape. That is, although not shown in detail, the induction coil which receives power may be provided at the right end of the coil holder 130, and constitute the power reception part 220.

The power reception part 220 mounted to the coil holder 130 may be embodied with a reception induction coil 222 patterned on the same plane as the PCB. That is, as illustrated in the drawing (see FIG. 9), in the power reception part 220 according to the first embodiment of the present disclosure, the reception induction coil 222 provided on the lower surface of the coil holder 130 may be configured to be wound multiple times on the PCB in a spiral shape relative to a reception center point 224.

In addition, the light transmission module 810 may be provided on the lower surface of the coil holder 130.

The light transmission module 810 may emit light by power supplied from the power reception part 220. The light transmission module 810 may be configured as a part of the detection part 800, and use the LED emitting light as described above.

The power reception part 220 and the light transmission module 810 may be electrically connected to each other. That is, the power reception part 220 and the light transmission module 810 may be configured to form the closed circuit in cooperation with the on/off part 230. Accordingly, the power reception part 220 and the light transmission module 810 provided in the coil holder 130, and the on/off part 230 may be configured to be electrically connected to each other by the PCB.

In addition, although not shown, the coil holder 130 may further include a conversion module that converts alternating current (AC) to direct current (DC).

A holder terminal 132 may be provided on the upper surface of the right end of the coil holder 130.

The holder terminal 132 may be a part to which the lower end of the transparent electrode film 240 is inserted and connected.

As illustrated in the drawing, the coil holder 130 may be configured to have an approximate ring shape as a whole, and the right end of the coil holder 130 may be configured to be relatively large in width such that the power reception part 220 may be mounted thereto.

Multiple grooves may be formed in the outer and inner circumferential surfaces of the coil holder 130. Specifically, a holding groove 130a may be formed in each of the front end rear ends of the coil holder 130 by being recessed inward therefrom, and a hook passing groove 130b may be formed in each of the front and rear of the right end of the coil holder 130 and the inner side of a left end thereof.

The holding groove 130a may be a part through which a holding guide piece 148 to be described below is received and passes, and the hook passing groove 130b may be a part through which an upper hook 140a or a lower hook 150a to be described below is received or passes.

The coil holder 130 may be protected by the upper cover 140 and the lower cover 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be formed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be formed to be partially open and may have a film hole 142a such that the lower end of the transparent electrode film 240 passes therethrough.

The upper cover 140 may be configured to cover the coil holder 130. Accordingly, an upper edge 144 may be formed on an outer circumferential surface of such an upper cover 140 by vertically bending downward and extending. The upper edge 144 may be configured to have a predetermined height and may cover the side surface of the coil holder 130.

In addition, the upper cover 140 may also be configured to have a shape of a ring like the shape of the coil holder 130, and an upper hole edge 146 may be formed in a center hole of the upper cover 140 by extending downward, the upper hole edge corresponding to the upper edge 144.

The upper edge 144 and the upper hole edge 146 are formed to be stepped. That is, as illustrated in FIG. 11, an edge step part 144a formed to be stepped may be formed on the inner surface of the upper edge 144, and a hole step part 146a formed to be stepped may be formed on the outer circumferential surface of the upper hole edge 146. The edge step part 144a and the hole step part 146a may be parts on which a lower edge 152 and a lower hole edge 154, respectively, of the lower cover 150 to be described below are seated.

A pair of rib grooves 142b may be formed on the right surface of the terminal holder 142 by being recessed leftward. That is, as illustrated in FIG. 10, the pair of rib grooves 142b may be formed on each of the right surface of the terminal holder 142 and the right surface of the upper edge 144, and such rib grooves 142b may be parts in which a pair of guide ribs 162 to be described below is received.

The holding guide piece 148 may be formed on the lower surface of the upper cover 140 by protruding downward therefrom. That is, a pair of holding guide pieces 148 may be formed on the front and rear of the lower surface of the upper cover 140 by protruding by predetermined heights downward therefrom. Such holding guide pieces 148 are intended to support the coil holder 130 such that the coil holder 130 is securely held.

Of course, such holding guide pieces 148 may be formed on the lower cover 150 in addition to the upper cover 140, and may be formed on the left and right of the upper cover 140 in addition to the front and rear of the upper cover 140. Alternatively, one holding guide piece may be formed, and each of the holding guide pieces may be formed in various shapes such as quadrangular and circular shapes.

A hook may be formed on the upper cover 140 such that the upper cover 140 is coupled to the lower cover 150. That is, as illustrated in FIG. 11, at least one upper hook 140a may be formed on each of the upper edge 144 and the upper hole edge 146. Specifically, the upper hook 140a is illustrated to include three upper hooks, and may be formed on each of the left end of the upper hole edge 146 and the front and rear of the right end of the upper edge 144.

The lower cover 150 may also have a ring shape as a whole like the upper cover 140, and the outer edge of the lower cover 150 may bend vertically upward to constitute the lower edge 152, and the inner hole edge of the lower cover may protrude upward to constitute the lower hole edge 154.

The lower edge 152 and the lower hole edge 154 may be configured to have heights smaller than heights of the upper edge 144 and the upper hole edge 146, and may be parts which are in contact with the edge step part 144a and the hole step part 146a, respectively, formed in the upper cover 140 to be coupled thereto.

Three lower hooks 150a may be formed on the lower cover 150 by protruding upward therefrom. The lower hooks 150a may be coupled to the upper hooks 140a, respectively, such that the upper cover 140 and the lower cover 150 are securely coupled to each other. Accordingly, the upper hooks 140a and the lower hooks 150a may have shapes corresponding to each other, and may be formed at upper and lower positions, respectively, corresponding to each other.

As described above, the transparent electrode film 240 may be made of a transparent material such as the ITO film, and may be configured to have length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from coming in contact with the food contained in the inner container body 120, and may be prevented from coming in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As is illustrated in FIG. 3, the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the reed switch 234.

The film guide 160 may be formed vertically on the inner surface of the outer container body 110 to attach the transparent electrode film 240 thereto. That is, as illustrated in the drawing, the film guide 160 may be formed vertically and longitudinally on the right inner surface of the outer container body 110 and may guide the attachment of the transparent electrode film 240.

The film guide 160 may be composed of the pair of guide ribs 162 formed by protruding from a side of the surface (an inner surface) of the outer container body 110, and a guide surface 164 formed between the pair of guide ribs 162.

As illustrated in FIG. 5, the guide ribs 162 may be configured as a pair of ribs having predetermined heights, and may be vertically formed to be parallel to each other such that a predetermined width is defined between the pair of ribs.

In addition, the guide surface 164 may be formed between the pair of guide ribs 162, and is preferably configured as a flat surface. That is, since the inner container body 120 and the outer container body 110 have circular cross-sections, the side surface of the outer container body 110 may have a predetermined curvature. However, the guide surface 164 may be configured to have a flat surface.

Accordingly, the guide surface 164 may be configured as a flat surface such that the transparent electrode film 240 is easily attached to the guide surface 164. That is, in order to easily attach the transparent electrode film 240 having a flat surface to the guide surface, the guide surface 164 is also preferably configured as a flat surface.

Meanwhile, the guide surface 164 may be formed by protruding from a side (an inner side) of the surface (the inner surface) of the outer container body 110 or by being recessed therefrom. That is, the guide surface 164 formed on the inner side surface of the outer container body 110 may be configured to have the same plane as the inner side surface of the outer container body 110, but may be formed by protruding from the inner side of the inner surface of the outer container body 110, or by being recessed outward from the inner surface of the outer container body 110.

The guide surface 164 is preferably configured to have a width corresponding to the width of the transparent electrode film 240. That is, the transparent electrode film 240 may be attached to the guide surface 164, so the size of the width of such a guide surface 164 may be the same as the size of the width of the transparent electrode film 240, or is preferably configured to be at least slightly larger than the size of the width of the transparent electrode film 240.

As described above, the transparent electrode film 240 may be vertically and longitudinally attached to the film guide 160 formed on the inner surface of the outer container body 110.

In addition, the transparent electrode film 240 may bend perpendicularly at a connection part A of the main handle 302 with the upper end of the outer container body 110. In this case, to prevent the cutting of the transparent electrode film 240, the connection part A is preferably configured in an arc shape having a radius R of a predetermined size. That is, the connection part A at which the upper end of the right surface of the outer container body 110 and the bottom surface 235a of the mounting end 235 meet may be configured to have curvature such that the transparent electrode film 240 is effectively attached.

Meanwhile, a magnet groove 126 may be formed in the upper end of the inner container body 120 by being recessed therefrom to the outside so as to receive the permanent magnet 232 therein. That is, as illustrated in the drawing (see FIG. 7) the upper end of the right surface of the inner container body 120 may be bent to be stepped to the right so as to form the magnet groove 126, and such a magnet groove 126 may be a part in which the permanent magnet 232 and a magnet holder 404 to be described below are located.

In addition, it is preferable that the magnet groove 126 is formed at a side of the reed switch groove 236. That is, as illustrated in the drawing (see FIG. 7), the magnet groove 126 may be formed at the left of the reed switch groove 236 in which the reed switch 234 is received. Accordingly, the reed switch 234 received in the reed switch groove 236 and the permanent magnet 232 may be close to each other, so the reed switch 234 may be operated by the permanent magnet 232.

The container lid 400 may be composed of an outer wall 410 configured in a shape of a circular ring and constituting the appearance of the container lid, an inner wall 420 provided to have a diameter smaller than a diameter of the outer wall 410 and having the lid hole 401 formed therein-side, and an upper surface 430 connecting an upper end of the outer wall 410 with an upper end of the inner wall 420.

Specifically, the container lid 400 may have a shape of a circular ring, as a whole, having a hollow inner part having a predetermined width. That is, the container lid 400 may have the lid hole 401 to be described below formed therein by passing vertically therethrough, and may have the structure of a circular ring having a U-shaped section.

The container lid 400 is intended to cover the upper surface of the container body 100, and the lid hole 401 may be formed in the center of the container lid 400 by being vertically formed therethrough, and the cap 450 may be removably mounted to the lid hole 401. That is, as illustrated in the drawing, a hole may be formed in the center of the container lid 400 by being vertically formed therethrough and may constitute the lid hole 401, and the cap 450 may cover such a lid hole 401.

The cap 450 may be composed of a top plate 460 exposed from the upper side of the container lid 400, and a cap body 470 is received in the lid hole 401.

As illustrated in FIG. 13, the cap body 470 may be configured in a shape of a truncated cone having a hollow inner part. That is, the cap body 470 may be configured in the shape of a truncated cone having a diameter gradually decreasing going upward.

The top plate 460 may cover the upper surface of the cap body 470 having a predetermined height, and as illustrated in the drawing, may be configured to have a diameter larger than a diameter of the upper end of the cap body 470.

The cap body 470 may include a middle ring 472 formed by protruding outward therefrom and in contact with the inner surface of the upper end of the lid hole 401, and a lower ring 474 formed by protruding outward from the outer circumferential surface of the lower end of the cap body and in contact with the inner surface of the lower end of the lid hole 401.

Specifically, the middle ring 472 may be formed by protruding outward from the center portion of the cap body 470, and may constitute the same plane as the upper surface 430 of the container lid 400 when the cap 450 is mounted to the container lid 400. Accordingly, the upper part of the middle ring 472 may be exposed to the upper side of the container lid 400.

An air groove 476 may be formed in the middle ring 472.

The air groove 476 may allow air to flow to the upper and lower sides of the middle ring 472 of the cap 450, and may be formed by being recessed inward from the outer circumferential surface of the middle ring 472 as illustrated in FIG. 14.

As illustrated in FIG. 15, the lower ring 474 may be formed by protruding by a predetermined size outward from the outer circumferential surface of the lower end of the cap body 470, and the outer circumferential surface of such a lower ring 474 may be in contact with the inner circumferential surface of the lower end of the inner wall 420 of the container lid 400.

As illustrated in FIG. 15, the outer wall 410 may be configured to correspond to a vertical size of the inner wall 420 or may be preferably configured to have a vertical size larger than the vertical size of the inner wall 420.

In addition, the gasket 402 described above may be provided on the outer circumferential surface of the lower end of such an outer wall 410. The gasket 402 is preferably made of an elastic material such as rubber.

A middle protrusion part 422 supporting the lower end of the middle ring 472 of the cap 450 may be formed on the inner surface of the inner wall 420, and a lower protrusion part 424 in contact with the outer surface of the lower ring 474 may be formed by protruding inward from the inner surface of the inner wall 420.

As illustrated in the drawing, the middle protrusion part 422 may be formed to have a predetermined thickness by protruding inward from the inner surface of the inner wall 420. Such a middle protrusion part 422 is preferably configured by being divided into multiple middle protrusion parts. Accordingly, air may vertically flow through space between the multiple middle protrusion parts 422.

The lower protrusion part 424 may be formed by protruding inward from the inner surface of the lower end part of the inner wall 420, and as illustrated in FIG. 15, is preferably configured to protrude inward more than the middle protrusion part 422.

Meanwhile, a fastening protrusion 478 may be formed on the lower end of the cap 450 by protruding outward therefrom, and a locking path 440 may be formed on the lower end of the inner wall 420 such that the fastening protrusion 478 is received in the locking path so as not to be removed therefrom.

More specifically, the fastening protrusion 478 may be formed on the outer circumferential surface of the lower ring 474 of the cap 450 by protruding outward therefrom. Such a fastening protrusion 478 is configured such that the cap 450 is not removed from the container lid 400 after being mounted thereto.

The locking path 440 may prevent the fastening protrusion 478 from being removed upward therefrom after the fastening protrusion 478 is received in the locking path 440. The locking path 440 may be formed by being recessed outward from the inner circumferential surface of the lower protrusion part 424 of the inner wall 420, and may be composed of an entrance groove 442 guiding the vertical movement of the fastening protrusion 478, and a locking groove 444 formed by extending laterally from the lower end of the entrance groove 442 and preventing the upward removal of the fastening protrusion 478.

That is, as illustrated in FIG. 15, a portion of the lower protrusion part 424 may be cut to form the entrance groove 442, and the entrance groove 442 may be connected to the locking groove 444 formed by extending laterally by a predetermined length after such an entrance groove 442 extends downward and bends perpendicularly.

Accordingly, when the fastening protrusion 478 moves downward along the entrance groove 442, moves laterally, and is received in the locking groove 444, the fastening protrusion 478 may be prevented from being removed upward therefrom.

Of course, the entrance groove 442 and the locking groove 444 may function to define a gap between the cap 450 and the container lid 400, and may function as an air flow path such that the air flows in the vertical direction of the container lid 400. That is, air may flow to the inside and outside of the container body 100 through the locking path 440 and the air groove 476.

Accordingly, the reason in which the air is allowed to flow to the inside and outside of the container body 100 with the locking path 440 and the air groove 476 not being located on the same vertical line is to prevent pressure difference between the inside and outside of such a container body 100, and to prevent the ejection of the food contained in the container body 100 to the outside, since when the food inside the container body 100 is crushed or mixed, the inner pressure of the container body 100 may be different from an atmospheric pressure.

A magnet holder 404 may be provided on the outer circumferential surface of the container lid 400. That is, as illustrated in the drawing, the magnet holder 404 may be formed on the outer circumferential surface of the container lid 400 by protruding therefrom to the outside, and have the permanent magnet 232 mounted therein.

The permanent magnet 232 is intended to control the turning on/off of the reed switch 234 when the container lid 400 is mounted to or removed from the container body 100.

Meanwhile, the lower surface of the container body 100 may be configured to have a shape corresponding to a shape of the upper surface of the main body 500 such that the container body 100 may be easily attached to and detached from the upper surface of the main body 500.

More particularly, the container body 100 may be mounted to a seating step 900 of the main body 500 to be described below.

Accordingly, the lower surface of the container body 100 may be configured to have the shape corresponding to the shape of the upper end of the main body 500, so the container body 100 may be stably mounted to and removed from the main body 500.

A container body end 170 having a predetermined width may be formed on the lower surface of the container body 100 by protruding downward therefrom. The container body end 170 may be a part which is in contact with the upper surface of a lower step 910 of the main body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the main body 500, an upper step 920 of the main body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open and a coil seating part groove 170*a* may be formed therein. The coil seating part 940 to be described below may be received in such a coil seating part groove 170*a*.

A circular end 174 may be formed on the center of the lower surface of the container body 100 by protruding downward therefrom. That is, the circular end 174 protruding downward may be provided in the center of the upper step receiving groove 172.

As illustrated in the drawing, the circular end 174 may have the shape of a circular ring and be hollow therein, which may provide a passage connecting the blade assembly 200 to the motor assembly 600.

The circular end 174 may be a part received in a circular end receiving groove 980 formed in the main body 500 to be described below.

Multiple mounting protrusions 174*a* may be formed on the outer circumferential surface of the circular end 174 by protruding radially therefrom. Each of the mounting protrusions 174*a* may function to tightly mount the container body 100 to the corresponding position of the main body 500 such that the container body 100 does not rotate. The mounting protrusion 174*a* may have at least one mounting protrusion 174*a*.

In the present disclosure, the mounting protrusion 174*a* is illustrated to have four mounting protrusions 174*a*. As illustrated in FIG. 4, such a mounting protrusion 174*a* may be formed to have thickness gradually decreasing going toward the outside. This is intended to easily receive the mounting protrusions 174*a* in protrusion grooves 982 to be described below.

Figure 17:
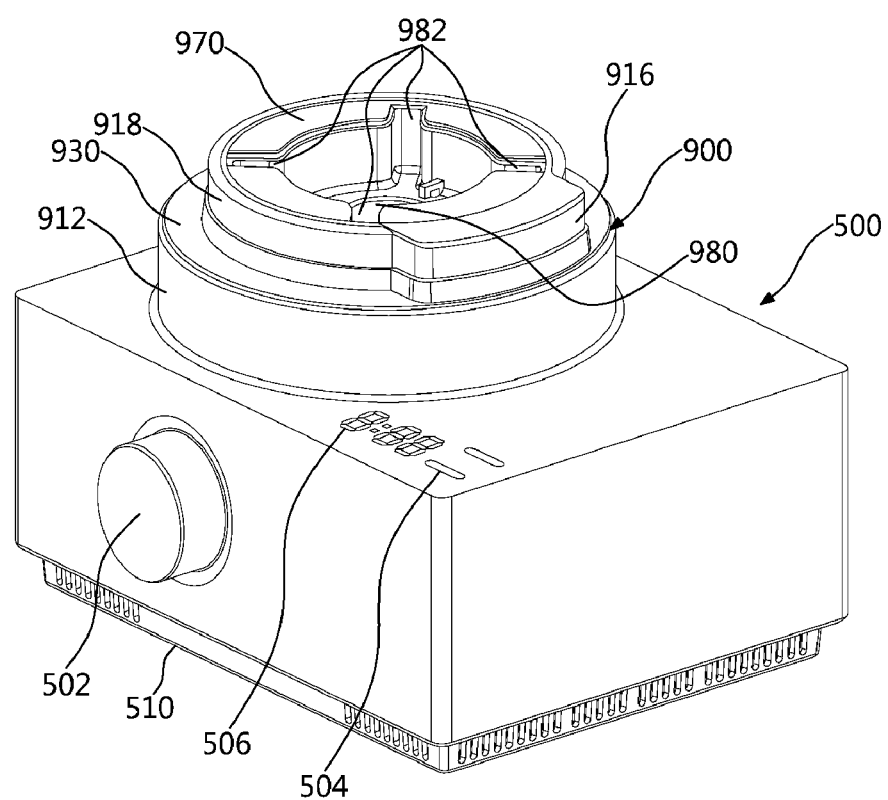
FIG. 17 is a perspective view of a main body constituting the blender according to an embodiment of the present disclosure.
Figure 18:
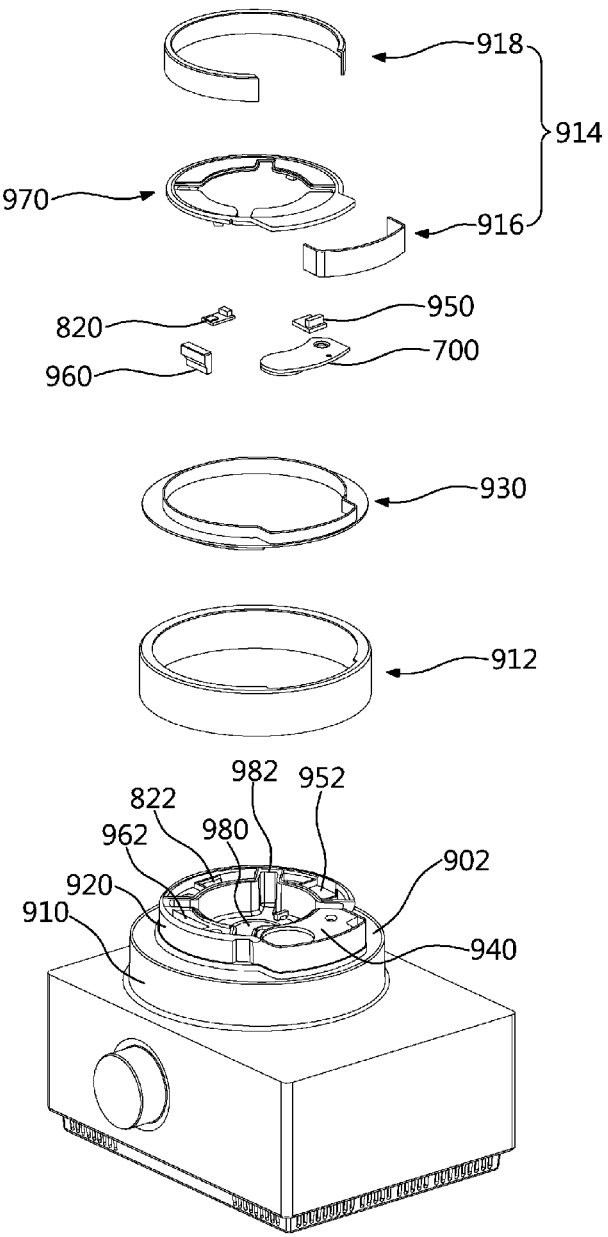
FIG. 18 is an exploded perspective view illustrating a configuration of an upper half of the main body constituting the blender according to the embodiment of the present disclosure.
Figure 19:
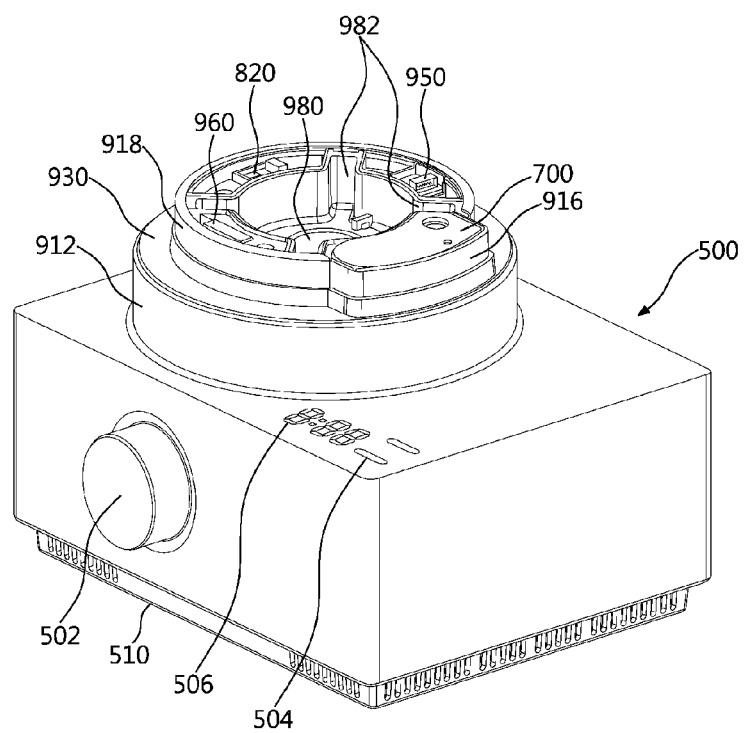
FIG. 19 is illustrating a configuration of the main body in a state in which a cover is removed from the main body constituting the blender according to the embodiment of the present disclosure.

In FIGS. 17 to 19, a configuration of the upper half part of the main body 500 is illustrated in detail. That is, FIG. 17 is a perspective view of the main body 500; FIG. 18 is an exploded perspective view illustrating a configuration of an upper half part of the main body 500; and FIG. 19 is a perspective view illustrating a configuration of the main body 500 from which the cover is removed.

As illustrated in these drawings, the seating step 900 may be provided on the upper surface of the main body 500 by protruding therefrom to be stepped upward such that the lower surface of the container body 100 is seated thereon.

The seating step 900 may be a part by which the lower end of the container body 100 is seated and be supported. Accordingly, such a seating step 900 may be configured to have the shape corresponding to the shape of the lower part of the container body 100.

Particularly, the seating step 900 may be formed by being stepped, and may include the lower step 910 having a diameter corresponding to the diameter of the lower end of the container body 100, and the upper step 920 formed by protruding upward from the lower step 910 and having a diameter smaller than the diameter of the lower step 910.

As illustrated in the drawing, the lower step 910 may be configured to have a circular shape and a predetermined height, and the upper step 920 having a diameter smaller than the diameter of the lower step 910 may be formed on the upper part of such a lower step 910 by protruding upward therefrom to have a predetermined height. Accordingly, like the upper surface of the main body 500, a horizontal step surface 902 may be formed between the lower step 910 having the larger diameter and the upper step 920 having the smaller diameter.

A lower step ring 912 and an upper step ring 914 having shapes corresponding to the outer surfaces of the lower step 910 and the upper step 920, respectively, may be provided on the outer surfaces of the lower step 910 and the upper step 920, respectively. That is, the lower step ring 912 and the upper step ring 914 may be provided on the outer circumferential surfaces of the lower step 910 and the upper step 920, respectively, which have the outer surfaces of circular shapes, and may cover the outer surfaces (side surfaces) of the lower step 910 and the upper step 920.

The lower step ring 912 and the upper step ring 914 may protect parts thereinside and may function as exterior materials. Accordingly, like the outer handle 304, the lower step ring 912 and the upper step ring 914 may be made of a material such as stainless steel which has a smooth surface and is resistant to rust.

In addition, an elastic member 930 made of an elastic material may be provided on the step surface 902 provided between the upper step 920 and the lower step 910. As illustrated in the drawing, the elastic member 930 may be configured to cover the step surface 902 formed on the upper surface of the lower step 910, and to cover the lower half part of the upper step 920.

The elastic member 930 may be made of an elastic material, and thus may function to buffer impact which may be generated when the container body 100 sits on the main body 500. That is, when the lower surface of the container body 100 sitting on the upper step 920 is in contact with the upper step 920, the elastic member 930 may function to prevent breakage or noise that may occur due to the collision of the lower surface of the container body 100 with the upper step 920 and the lower step 910 of the main body 500, which are made of solid materials.

Accordingly, the elastic member 930 may be made of a material such as rubber, and may function to make the seating of the container body 100 efficient. Further, the elastic member 930 may be made of a conductive rubber when required, and in this case, the conductive rubber may be provided even on the lower surface of the container body 100.

The power transmission part 700 and the light reception module 820 may be mounted to the upper surface of the upper step 920.

Particularly, the coil seating part 940 may be formed on the right surface of the upper step 920 by protruding therefrom to the right, and the power transmission part 700 may be mounted to the upper surface of such a coil seating part 940.

The power transmission part 700 may be located to be adjacent to the power reception part 220 provided in the container body 100, and may function to supply power to the power reception part 220. Accordingly, such a power transmission part 700 may be configured as an induction coil. That is, like the power reception part 220, the induction coil may be configured by being wound multiple times on the same plane, such as a PCB, in a spiral shape relative to a transmission center point (not shown).

In addition, although not shown in detail, the main body 500 may have an oscillation circuit part therein. Such an oscillation circuit part may generate current and apply the current to the power transmission part 700. Accordingly, a magnetic field may be formed in the power transmission part 700 by the applied current. Furthermore, the oscillation circuit part may change the intensity of the current applied to the power transmission part 700, and thus the magnetic field may be changed in the power transmission part 700 by the change of the current intensity.

Accordingly, as in the present disclosure, with the power reception part 220 and the power transmission part 700 installed to vertically correspond to each other, as the intensity of current applied to the power transmission part 700 changes, the magnetic field of the power transmission part 700 may be changed, and a magnetic flux passing through the power reception part 220 may be changed due to inductive coupling between the power transmission part 700 and the power reception part 220, so the induced electromotive force may be generated in the power reception part 220. Furthermore, such an induced electromotive force may be supplied to the light transmission module 810.

The light reception module 820 may be provided at a side opposite to the power transmission part 700. That is, the light reception module 820 may be mounted in a receiving groove 822 formed in the left end of the upper surface of the upper step 920, which is a position vertically corresponding to the light transmission module 810 mounted to the container body 100.

Particularly, the receiving groove 822 having a predetermined size may be formed in the left end of the upper surface of the upper step 920 by being depressed therefrom, and the light reception module 820 may be mounted in such a receiving groove 822.

As described above, the light reception module 820 may include the photosensor. The light reception module 820 may receive light transmitted by the light transmission module 810, and transmit a light reception signal.

In addition, a Hall sensor 950 and a container body detection switch 960 may be provided on the upper surface of the upper step 920. That is, a container body switch groove 962 and a sensor groove 952 may be formed in the front end portion and rear end portion of the upper surface of the upper step 920, respectively, by being depressed therefrom, and the container body detection switch 960 and the Hall sensor 950 may be mounted in the container body switch groove 962 and the sensor groove 952, respectively.

The container body detection switch 960 may be configured as a reed switch, and may detect whether the container body 100 is seated on the upper surface of the main body 500. When such a container body detection switch 960 is provided, a magnet corresponding thereto may be provided on the lower end of the container body 100.

The Hall sensor 950 is intended to determine a type of the container body 100 sitting on the main body 500, and even in this case, a signal transmission part corresponding thereto may be required on the lower surface of the container body 100.

The upper step ring 914 mounted to the edge of the upper step 920 may be configured to be divided into two parts. That is, as illustrated in FIG. 6, the upper step ring 914 may include a protruding piece 916 covering the outer surface of the coil seating part 940 formed on the right surface of the upper step 920 by protruding therefrom to the right, and a curved piece 918 covering the remaining outer surface of the upper step 920.

Meanwhile, the upper part of the upper step 920 may be covered by a cover 970. Accordingly, the power transmission part 700, the light reception module 820, the container body detection switch 960, and the Hall sensor 950 mounted to the upper step 920 may be covered and protected by the cover 970.

In addition, the seating step 900 may have a center vertically formed therethrough such that the blade assembly 200 of the container body 100 and the motor assembly 600 provided in the main body 500 may be connected to each other.

More particularly, the circular end receiving groove 980 may be formed in the center portion of the upper step 920 by being depressed therefrom, and the circular end 174 of the lower end of the container body 100 described above may be received in such a circular end receiving groove 980. That is, the upper step 920 may have the shape of a circular ring as a whole, and the circular end receiving groove 980 having a circular shape may be formed in the center portion of such an upper step 920.

At least one protrusion groove 982 may be formed in the inner surface of the upper step 920. The protrusion groove 982 may be formed by being depressed radially from the circular end receiving groove 980, and the mounting protrusions 174a of the container body 100 may be seated in the protrusion grooves 982.

Accordingly, the protrusion grooves 982 may be configured to have the size and number thereof corresponding to the size and number of the mounting protrusions 174a, and the size of the width of the protrusion groove 982 may be configured to be the same as or larger than the size of the width of the mounting protrusion 174a.

Figure 20:
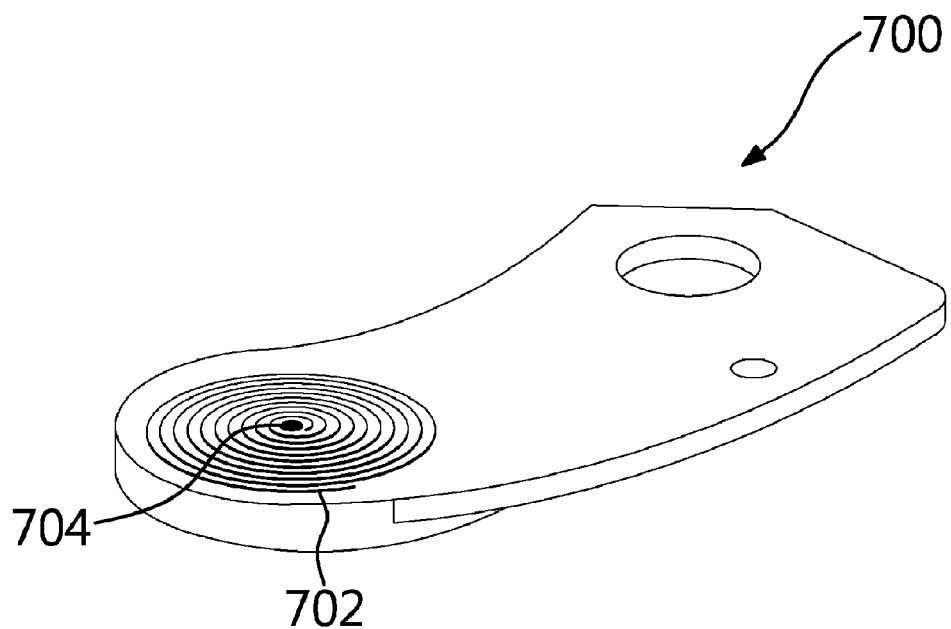
FIG. 20 is a perspective view of a power transmission means constituting the blender according to the embodiment of the present disclosure.
Figure 21:
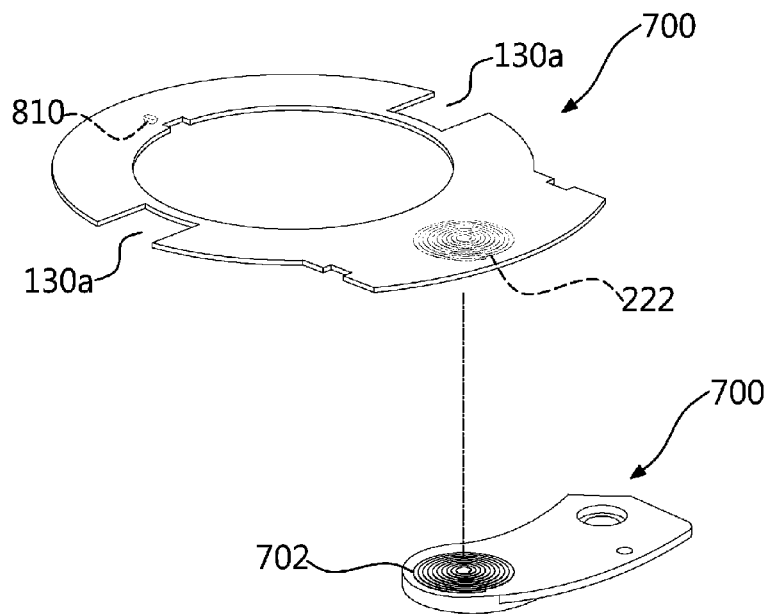
FIG. 21 is an exploded perspective view illustrating a mutual arrangement of a power transmission part and a coil holder constituting the blender according to the embodiment of the present disclosure.
Figure 22:
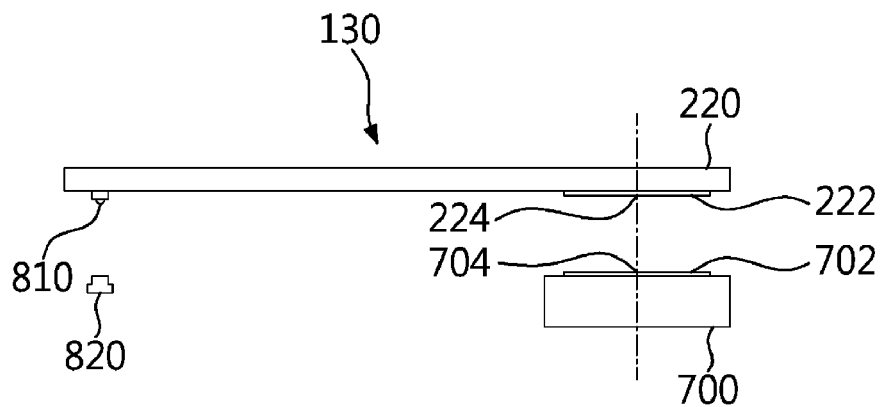
FIG. 22 is an exploded front view illustrating the mutual arrangement of the power transmission part and the coil holder constituting the blender according to the embodiment of the present disclosure.

In FIGS. 20 to 22, a configuration of a power transmission part 700 and an example of the arrangement relation of the power transmission part and the coil holder are illustrated. That is, FIG. 20 is a perspective view of the power transmission part 700 constituting the blender according to the embodiment of the present disclosure, and FIGS. 21 and 22 are an exploded perspective view and an exploded front view, respectively, illustrating a mutual arrangement relation of the power transmission part 700 and the coil holder 130.

As described above, the power transmission part 700 may be installed on a side of the upper part of the main body 500.

The power transmission part 700 may be embodied with a transmission induction coil 702 patterned on the same plane as a PCB. The transmission induction coil 702 may be wound multiple times on the PCB in a spiral shape relative to a transmission center point 704.

The main body 500 may include the oscillation circuit part (not shown) therein. The oscillation circuit part (not shown) may apply current to the transmission induction coil 702, and when the current is applied to the transmission induction coil 702, a magnetic field may be generated in the transmission induction coil 702.

In addition, such an oscillation circuit part (not shown) may be mounted to the power transmission part 700, and may change the intensity of the current applied to the transmission induction coil 702, and thus the magnetic field may be changed in the transmission induction coil 702 by the change of the current intensity.

The light transmission module 810 and the light reception module 820 are preferably located to be adjacent to each other, and as illustrated in FIG. 2, when the container body 100 is mounted to the main body 500, the light transmission module 810 and the light reception module 820 may be located at upper and lower positions, respectively, close to each other.

When the light reception module 820 receives the signal of the light transmission module 810, the motor assembly 600 may operate.

Like the embodiment illustrated in FIG. 22, when the container body 100 is seated on the main body 500, the transmission induction coil 702 of the main body 500 and the reception induction coil 222 of the container body 100 are preferably disposed vertically at a predetermined interval at positions corresponding to each other.

Specifically, when the container body 100 is seated on the main body 500, the transmission induction coil 702 constituting the power transmission part 700 and the reception induction coil 222 constituting the power reception part 220 may be concentric in the same center points 704 and 224, and may be disposed to be parallel to each other by facing each other.

In addition, inductive coupling between the transmission induction coil 702 constituting the power transmission part 700 and the reception induction coil 222 constituting the power reception part 220 may be selectively performed under a specific condition.

When the intensity of current applied to the transmission induction coil 702 changes, the magnetic field of the transmission induction coil 702 may be changed, and a magnetic flux passing through the reception induction coil 222 may be changed due to inductive coupling between the transmission induction coil 702 and the reception induction coil 222, so induced electromotive force may be generated in the reception induction coil 222.

Accordingly, it is preferable that the positions and arrangement of the transmission induction coil 702 and the reception induction coil 222 are determined such that inductive coupling between the transmission induction coil 702 and the reception induction coil 222 is effectively performed.

Furthermore, as described above, the light transmission module 810 configured to transmit a signal to the outside may be provided at the lower part of the container body 100, and in the embodiment, the light transmission module 810 is illustrated to be installed on the left end of the lower surface of the coil holder 130.

In addition, it is preferable that the reception induction coil 222 of the coil holder 130 and the light transmission module 810 are electrically connected to each other, and the light transmission module 810 may transmit a signal by receiving power from the reception induction coil 222.

The light transmission module 810 may transmit a signal to the light reception module 820 provided in the main body 500. That is, the light reception module 820 may receive the signal transmitted by the light transmission module 810.

Accordingly, the light transmission module 810 and the light reception module 820 are preferably disposed at positions corresponding to each other such that the transmission and reception of a signal between the light transmission module 810 and the light reception module 820 are efficiently performed, and in the embodiment, when the container body 100 is coupled to the main body 500, the container body 100 and the main body 500 may be located vertically at a predetermined interval.

In addition, as described above, in the embodiment of the present disclosure, the light transmission module 810 may, for example, include a light source which emits light, and the light reception module 820 may include a light sensor which detects light emitted from the light source. The light source may include an LED light source, and the light sensor may be embodied as a semiconductor device, a photodiode, or a phototransistor, etc.

Hereinafter, an operation of the blender of the present disclosure having the above-described configuration will be described with reference to the accompanying drawings.

When the container body 100 sits on the main body 500, the state of FIG. 1 may be realized, and in this state, the operation of the blender of the present disclosure may start.

First, power supply from the outside may be required such that a user operates the blender, and a wireless power supply device having the wireless power module 520 may be used for such power supply. That is, the power supply from the outside may be performed by the induced electromotive force. Of course, the power supply may be performed by wire.

The power of the wireless power module 520 may be supplied to parts, in which power is required, such as the motor assembly 600, the manipulation part 504, and the power transmission part 700, and a user may start or stop the operation of the blender by manipulating the manipulation part 504 or the knob 502.

For example, when a user starts crushing food by manipulating the manipulation part 504 or the knob 502, the motor assembly 600 is required to be operated to rotate the blades of the blade assembly 200.

However, in this case, the detection system may determine whether the container lid 400 is closed, and when the container lid 400 is opened, the motor assembly 600 and the blade assembly 200 may not be operated.

Particularly, since the reed switch 234 may be normally open (off), the power reception part 220, the reed switch 234, and the light transmission module 810 may not form a closed circuit in the container body 100, so that the light reception module 820 may not receive light.

Accordingly, when the light reception module 820 does not receive light, the power supply to the motor assembly 600 may be cut off by such a signal.

In this state, when the container lid 400 is closed, the permanent magnet 232 of the container lid 400 may be located to be adjacent to the reed switch 234, and the reed switch 234 may be turned on, whereby the power reception part 220, the reed switch 234, and the light transmission module 810 may form a closed circuit, so the light reception module 820 may receive light transmitted by the light transmission module 810.

In this case, due to the detection of the closing of the container lid 400, the motor assembly 600 may start operating by the manipulation of the user, and the food inside the container body 100 may be crushed. Of course, in this case, whether the container body 100 is mounted to the main body 500 may be detected by the container body detection switch 960 prior to the starting of the operation of the motor assembly 600.

In addition, in this case, the operation state of the blender of the present disclosure may be displayed to the outside by the display part 506, so the user may visually recognize the operation state or time of the blender.

Meanwhile, when the container lid 400 is mounted to or removed from the container body 100, the user may open or close the container lid 400 by grasping the upper half part of the cap 450. The container lid 400 may be in close contact with and mounted to the upper surface of the container body 100 by a force of pushing the container lid 400 downward by the user. In this case, the gap between the container lid 400 and the container body 100 may be covered by the gasket 402 provided on the outer surface of the container lid 400.

Additionally, the cap 450 mounted to the center portion of the container lid 400 may be removed therefrom by the user, and this may be performed by the user turning the cap 450 while the user grips the upper end of the cap 450 as described above.

For example, in order to mount the cap 450 to the container lid 400, the user may pass the fastening protrusion 478 of the cap 450 through the entrance groove 442 of the container lid 400 to a lower side thereof from an upper side thereof while the user grips the upper end of the cap 450 and may turn the cap 450 clockwise. In this case, the fastening protrusion 478 may be received in the locking groove 444 and the mounting of the cap 450 may be completed and at the same time, the upward removal of the cap 450 may be prevented.

In this state, when turning the cap 450 counterclockwise by gripping the upper end of the cap 450, the fastening protrusion 478 may be moved from the locking groove 444 and be located at the lower side of the entrance groove 442. In this case, when the user moves the cap 450 upward, the fastening protrusion 478 may pass through the entrance groove 442 to the upper side thereof from the lower side thereof, so the cap 450 may be removed from the container lid 400.

In addition, even when the cap 450 is mounted to the container lid 400, air may flow to the upper and lower sides of the container lid 400 through the air groove 476, so the vacuumization of the inside of the container body 100 or the generation of pressure difference between the inside and outside of the container body 100 may be prevented.

When the cap 450 is removed from the lid body 410 through the process described above, the user may insert food into the container body 100 through the lid hole 401, and may control the food contained inside the container body 100 by using a rod.

When the food inside the container body 100 is crushed or mixed by the operation of the motor assembly 600 and the blade assembly 200 and the work according to the intention of the user is completed, the user may raise and remove the container body 100 upward from the main body 500, open the container lid 400, and take out the food contained inside the container body 100.

The scope of the present disclosure is not limited to the embodiments illustrated above, and within the technical scope as described above, many other modifications based on the present disclosure will be possible for those skilled in the art.

For example, in the embodiment described above, the installation positions of the light transmission module 810 and the light reception module 820 are described to be located on the left ends of the container body 100 and the main body 500, respectively, but the installation positions of the light transmission module 810 and the light reception module 820 may be located on the right ends of the container body 100 and the main body 500, respectively, or on front or rear ends thereof.

In addition, in the embodiment described above, one light reception module 820 is illustrated to be mounted to the main body 500, but at least two light reception module 820 may be mounted thereto. The light reception module 820 may be configured in a ring shape on the upper surface of the upper step 920 to detect whether the container lid 400 is mounted irrespective of the mounting direction of the container body 100.

In addition, a transmission coil constituting the power transmission part 700 may include at least two transmission coils or may be configured in a ring shape on the upper surface of the upper step 920 such that power transmission is not limited to the mounting position of the container body 100.

In addition, the detection system may be configured variously. That is, instead of the light transmission module 810 and the light reception module 820, and the power transmission part 700 and the power reception part 220, an electrode plate (not shown) may be mounted to each of the container body 100 and the main body 500 so as to determine whether a capacitor is charged and a capacitance is detected, or an Hall IC or a reed switch may be used to detect whether a change of a magnetic field in the power reception part 220 has occurred.

The invention claimed is:

1. A blender comprising:
   a container body to receive food;
   a main body to support the container body;
   a container lid to removably mount to an upper surface of the container body to open/close an upper part of the container body; and
   a detection system to detect whether the container lid is mounted to the container body,
   wherein the detection system comprises a transparent electrode film to guide a flow of current,
   the container body comprises a film guide disposed vertically on a surface of the container body, and the transparent electrode film is disposed on the film guide, and
   the film guide comprises a pair of guide ribs protruding from a side of the surface of the container body, and a guide surface formed between the pair of guide ribs.

2. The blender of claim 1, wherein the transparent electrode film is an indium-tin oxide (ITO) film.

3. The blender of claim 2, wherein the transparent electrode film is attached to a surface of the container body.

4. The blender of claim 1, wherein the container body comprises:
   an outer container body constituting an appearance of the container body, and
   an inner container body disposed inside the outer container body.

5. The blender of claim 4, wherein each of the outer container body and the inner container body is made of a transparent material.

6. The blender of claim 4, wherein the transparent electrode film is provided between the outer container body and the inner container body.

7. The blender of claim 6, wherein the transparent electrode film is disposed at an inner surface of the outer container body.

8. The blender of claim 1, wherein the detection system comprises:
   a power transmission part disposed at the main body to supply power to the container body;
   a power reception part disposed at the container body to receive the power supplied from the power transmission part;
   an on/off part disposed at an upper side of the container body to turn on/off an electric circuit formed at the container body according to whether the container lid closes the container body;
   the transparent electrode film disposed at a surface of the container body and made of a transparent material, the transparent electrode film connecting the power reception part with the on/off part so as to allow the current to flow therebetween; and
   a detection part to detect the flow of the current in the electric circuit formed by the connection of the power reception part with the on/off part.

9. The blender of claim 8, wherein the on/off part comprises a permanent magnet and a reed switch disposed at the container lid and the container body, respectively.

10. The blender of claim 9, wherein the on/off part is configured to turn on when the permanent magnet and the reed switch are disposed adjacent to each other such that the electric circuit forms a closed circuit allowing the current to flow therethrough.

11. The blender of claim 8, wherein the detection part comprises a light emitter disposed at the container body and a light receptor disposed at the main body.

12. The blender of claim 11, wherein the light emitter disposed at the container body and the light receptor disposed at the main body are adjacent to each other to face each other when the container body is mounted on the main body.

13. The blender of claim 11, wherein the light emitter is connected to the electric circuit and emits light using the flow of the current in the electric circuit.

14. The blender of claim 11, wherein the light emitter is a light emitting diode (LED) and the light receptor is a photosensor.

* * * * *